United States Patent
Kim et al.

(10) Patent No.: US 11,361,148 B2
(45) Date of Patent: Jun. 14, 2022

(54) ELECTRONIC DEVICE SHARING CONTENT WITH AN EXTERNAL DEVICE AND METHOD FOR SHARING CONTENT THEREOF

(71) Applicant: Samsung Electronics Co., Ltd., Gyeonggi-do (KR)

(72) Inventors: Tae-jeoung Kim, Gyeonggi-do (KR); Hyun-june Kim, Gyeonggi-do (KR); Ki-chul Park, Gyeonggi-do (KR); Jin-woo Song, Seoul (KR); Hong-uk Woo, Seoul (KR)

(73) Assignee: Samsung Electronics Co., Ltd.

( * ) Notice: Subject to any disclaimer, the term of this patent is extended or adjusted under 35 U.S.C. 154(b) by 68 days.

(21) Appl. No.: 15/295,247

(22) Filed: Oct. 17, 2016

(65) Prior Publication Data
US 2017/0108997 A1  Apr. 20, 2017

(30) Foreign Application Priority Data

Oct. 16, 2015  (KR) .................. 10-2015-0144700
Jul. 14, 2016   (KR) .................. 10-2016-0089046

(51) Int. Cl.
*G06F 40/00*  (2020.01)
*G06F 40/143*  (2020.01)
(Continued)

(52) U.S. Cl.
CPC .......... *G06F 40/143* (2020.01); *G06F 3/0482* (2013.01); *G06F 3/1423* (2013.01);
(Continued)

(58) Field of Classification Search
CPC .. G06F 17/2247; G06F 3/0482; G06F 3/1423; G06F 3/1454; G06F 40/14;
(Continued)

(56) References Cited

U.S. PATENT DOCUMENTS 5,911,776 A * 6/1999 Guck .................. G06F 16/258
                                                    709/217
7,933,338 B1 * 4/2011 Choudhry ............. G06F 16/70
                                                    375/240.26

(Continued)

FOREIGN PATENT DOCUMENTS

CN  101227636  7/2008
CN  102244676  11/2011

(Continued)

OTHER PUBLICATIONS

Innovation Simple, "Website vs. Webpage", Apr. 21, 2009, 4 pages https://innovationsimple.com/uncategorized/website-vs-webpage/.*

(Continued)

*Primary Examiner* — Cesar B Paula
*Assistant Examiner* — David Faber
(74) *Attorney, Agent, or Firm* — The Farrell Law Firm, P.C.

(57) ABSTRACT

Methods and apparatuses are provided for sharing content between an electronic device and an external device. A web document including pieces of content is received. At least one piece of content executable in the external device is determined from among the pieces of content based on corresponding types of the pieces of content and function information of the external device. Information on the at least one piece of content is transmitted to the external device.

14 Claims, 21 Drawing Sheets

(51) Int. Cl.
| | |
|---|---|
| *G06F 3/14* | (2006.01) |
| *G06F 16/958* | (2019.01) |
| *G06F 16/951* | (2019.01) |
| *G06F 40/14* | (2020.01) |
| *G06F 3/0482* | (2013.01) |
| *G06F 3/16* | (2006.01) |
| *G06F 3/04883* | (2022.01) |

(52) U.S. Cl.
CPC ............ *G06F 3/1454* (2013.01); *G06F 3/165* (2013.01); *G06F 16/951* (2019.01); *G06F 16/972* (2019.01); *G06F 40/14* (2020.01); *G06F 3/04883* (2013.01); *G09G 2370/042* (2013.01); *G09G 2370/16* (2013.01); *G09G 2380/06* (2013.01)

(58) Field of Classification Search
CPC .... G06F 40/143; G06F 16/972; G06F 16/951; G06F 3/165; G06F 3/04883; G09G 2380/06; G09G 2370/042; G09G 2370/16
See application file for complete search history.

(56) References Cited

U.S. PATENT DOCUMENTS

| | | | | |
|---|---|---|---|---|
| 8,364,671 | B1* | 1/2013 | Sinton | G06F 16/738 725/74 |
| 8,554,938 | B2 | 10/2013 | Mittal | |
| 8,589,991 | B2 | 11/2013 | Hassan | |
| 8,789,131 | B2 | 7/2014 | Choi et al. | |
| 8,856,113 | B1* | 10/2014 | Sinton | G06F 16/738 707/728 |
| 2007/0204311 | A1 | 8/2007 | Hasek et al. | |
| 2008/0275877 | A1* | 11/2008 | Bates | G06F 16/958 |
| 2009/0080010 | A1* | 3/2009 | Nanaumi | G06F 16/93 358/1.15 |
| 2009/0177810 | A1 | 7/2009 | Kweon et al. | |
| 2009/0313318 | A1* | 12/2009 | Dye | G06Q 30/00 709/219 |
| 2010/0146051 | A1 | 6/2010 | Agrawal et al. | |
| 2011/0078161 | A1* | 3/2011 | Tran | G06F 16/4387 707/E17.104 |
| 2011/0106917 | A1 | 5/2011 | Park et al. | |
| 2011/0117898 | A1 | 5/2011 | Pereira et al. | |
| 2011/0283334 | A1 | 11/2011 | Choi et al. | |
| 2012/0079276 | A1* | 3/2012 | Evans | H04N 21/44029 713/170 |
| 2012/0200489 | A1* | 8/2012 | Miyashita | H04N 21/42209 345/156 |
| 2012/0265758 | A1 | 10/2012 | Han et al. | |
| 2013/0103797 | A1 | 4/2013 | Park et al. | |
| 2013/0166678 | A1* | 6/2013 | Barak | H04L 67/303 709/217 |
| 2013/0282793 | A1* | 10/2013 | Swings | H04N 21/43615 709/203 |
| 2013/0318037 | A1* | 11/2013 | Shan | G06F 16/162 707/609 |
| 2013/0325952 | A1* | 12/2013 | Draznin | H04N 21/41265 709/204 |
| 2014/0002389 | A1* | 1/2014 | Kim | H04N 21/43637 345/1.3 |
| 2001/0089389 | | 3/2014 | Kim et al. | |
| 2014/0344266 | A1* | 11/2014 | Bennett | G06F 16/248 707/734 |
| 2014/0358882 | A1* | 12/2014 | Diab | G06F 16/9535 707/706 |
| 2015/0172238 | A1 | 6/2015 | Ahmed et al. | |
| 2015/0339274 | A1* | 11/2015 | Pappu | G06F 40/134 715/205 |
| 2017/0147129 | A1* | 5/2017 | Kyoun | G06F 3/0488 |

FOREIGN PATENT DOCUMENTS

| | | |
|---|---|---|
| CN | 102510392 | 6/2012 |
| CN | 103338186 | 10/2013 |
| CN | 103546493 | 1/2014 |
| EP | 2 387 202 | 11/2011 |
| EP | 2 887 686 | 6/2015 |
| JP | 2005190079 | 7/2005 |
| KR | 1020110063200 | 6/2011 |
| KR | 1020140039869 | 4/2014 |
| KR | 1020140094995 | 7/2014 |
| WO | WO 2010/135101 | 11/2010 |
| WO | WO 2013/116362 | 8/2013 |

OTHER PUBLICATIONS

Spyglass, "Spyglass Prism: Concepts and Applications", Spyglass, 1997, pp. 1-8 + 2 cover pages (10 pages).*
European Search Report dated Apr. 20, 2018 issued in counterpart application No. 16855799.9-1217, 8 pages.
International Search Report dated Feb. 10, 2017 issued in counterpart application No. PCT/KR2016/011600, 10 pages.
Chinese Office Action dated May 6, 2020 issued in counterpart application No. 201680060049.3, 20 pages.
European Search Report dated Feb. 14, 2020 issued in counterpart application No. 16855799.9-1213, 7 pages.
Indian Examination Report dated Feb. 28, 2020 issued in counterpart application No. 201817013110, 5 pages.
Chinese Office Action dated Oct. 19, 2020 issued in counterpart application No. 201680060049.3, 16 pages.
Chinese Office Action dated Apr. 13, 2021 issued in counterpart application No. 201680060049.3, 23 pages.
EP Summons to Attend Oral Proceedings dated Apr. 28, 2021 issued in counterpart application No. 16855799.9-1213, 10 pages.
EP Result of Consultation dated Nov. 8, 2021 issued in counterpart application No. 16855799.9-1213, 15 pages.
EP Decision to Refuse dated Nov. 22, 2021 issued in counterpart application No. 16855799.9-1213, 18 pages.

* cited by examiner

FIG. 5
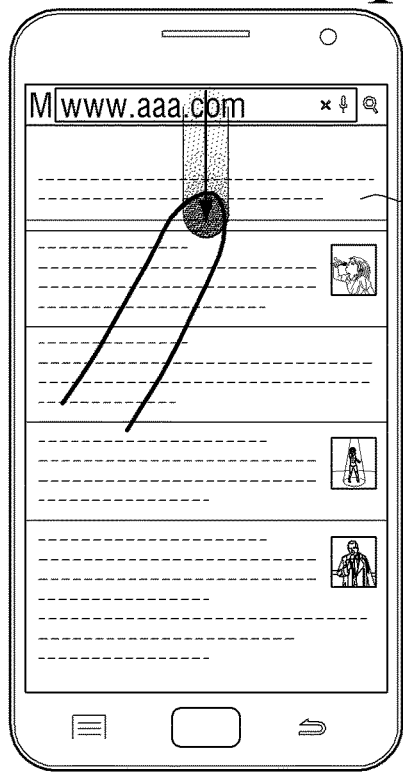
(a)
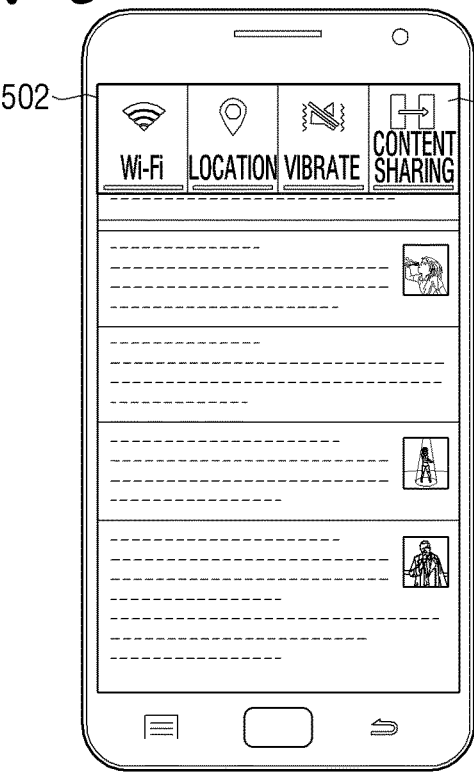
(b)
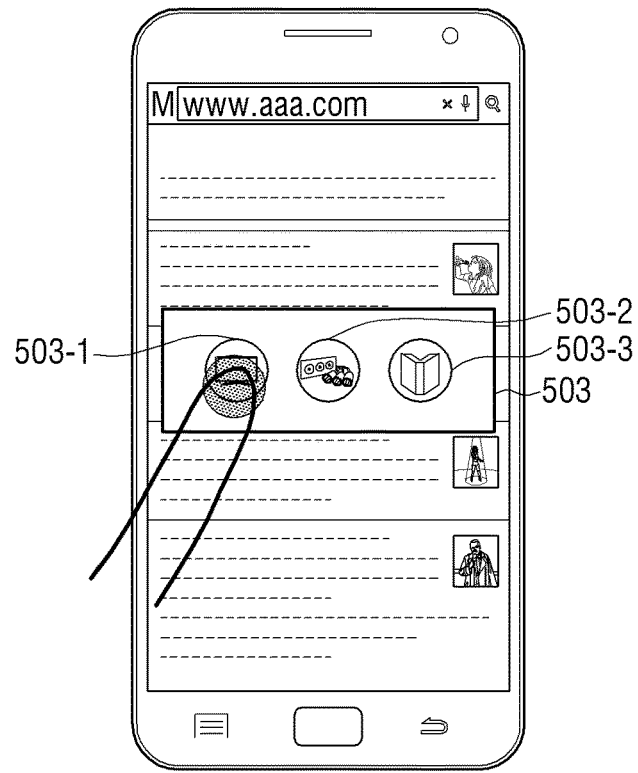
(c)

(a)  (b)  (c)

ELECTRONIC DEVICE SHARING CONTENT WITH AN EXTERNAL DEVICE AND METHOD FOR SHARING CONTENT THEREOF

PRIORITY

This application claims priority under 35 U.S.C. 119(a) to Korean Patent Application No. 10-2016-0089046, filed in the Korean Intellectual Property Office (KIPO) on Jul. 14, 2016, and Korean Patent Application No. 10-2015-0144700, filed in the KIPO on Oct. 16, 2015, the disclosures of which are incorporated herein by reference in their entireties.

BACKGROUND

1. Field of the Disclosure

The present disclosure relates generally to an electronic device sharing content and a method for sharing the content, and more particularly, to a method for transmitting content from an electronic device to an external device and a method for sharing the content.

2. Description of the Related Art

With the development of a wired and wireless communication networks, it has become possible to interconnect electronic devices that display a screen to output visibly recognizable data.

Accordingly, diverse data may be transmitted and received between the electronic devices through a wired or wireless communication network. For example, a first electronic device and a second electronic device may share a screen, and a content sharing method, such as, for example, mirroring, streaming, or the like.

As an example, according to the mirroring method, a screen of the first electronic device may be compressed and then transmitted to the second electronic device. The second electronic device may decompress and display the screen.

As another example, according to the streaming method, compressed image content in the first electronic device may be transmitted to the second electronic device. The second electronic device may decompress and display the image content.

The content sharing method is developing rapidly with improvements in wired and wireless connection methods, such as, for example, a cable or wireless-fidelity (Wi-Fi). Specifically, the content sharing method is being developed so as to be applied to all kinds of electronic devices with a screen, such as, for example, portable computers including a laptop personal computer (PC), a netbook PC, and a tablet PC, portable terminals including a smart phone and a personal digital assistant (PDA), and a television (TV).

The content sharing method may be used when a user wishes to view content through a larger screen of the second electronic device, instead of a small screen of the first electronic device.

In this case, the user may be inconvenienced by several steps that the user is required to complete to share the content.

For example, when there are two second electronic devices capable of sharing the content, the user must determine and select one device suitable for sharing the content from the two second electronic devices.

SUMMARY

The present disclosure has been provided to address at least the above problems and/or disadvantages and to provide at least the advantages described below. Accordingly, an aspect of the present disclosure provides the user with a content sharing method with intuitiveness and usability such that the first and second electronic devices may share content.

According to an embodiment of the present disclosure, a method is provided for sharing content between an electronic device and an external device. A web document including pieces of content is received. At least one piece of content executable in the external device is determined from among the pieces of content based on corresponding types of the pieces of content and function information of the external device. Information on the at least one piece of content is transmitted to the external device.

According to another embodiment of the present disclosure, an electronic device is provided sharing content with an external device. The electronic device includes a communicator configured to communicate with the external device. The electronic device also includes a display configured to display a web document including pieces of content. The electronic device further includes a processor configured to determine at least one piece of content executable in the external device from among the pieces of content based on corresponding types of the pieces of content and function information of the external device, and transmit information on the at least one piece of content to the external device through the communicator.

According to another embodiment of the present disclosure, an article of manufacture is provided for sharing content between an electronic device and an external device. The article of manufacture includes a non-transitory machine readable medium containing one or more programs which when executed implement the steps of receiving a web document comprising pieces of content, determining at least one piece of content executable in the external device from among the pieces of content based on corresponding types of the pieces of content and function information of the external device, and transmitting information on the at least one piece of content to the external device.

BRIEF DESCRIPTION OF DRAWINGS

The above and other aspects, features, and advantages of the present disclosure will be more apparent from the following detailed description when taken in conjunction with the accompanying drawings, in which:

FIGS. 5 to 13 are diagrams illustrating electronic devices sharing content, according to an embodiment of the present disclosure;

DETAILED DESCRIPTION

Figure 1:
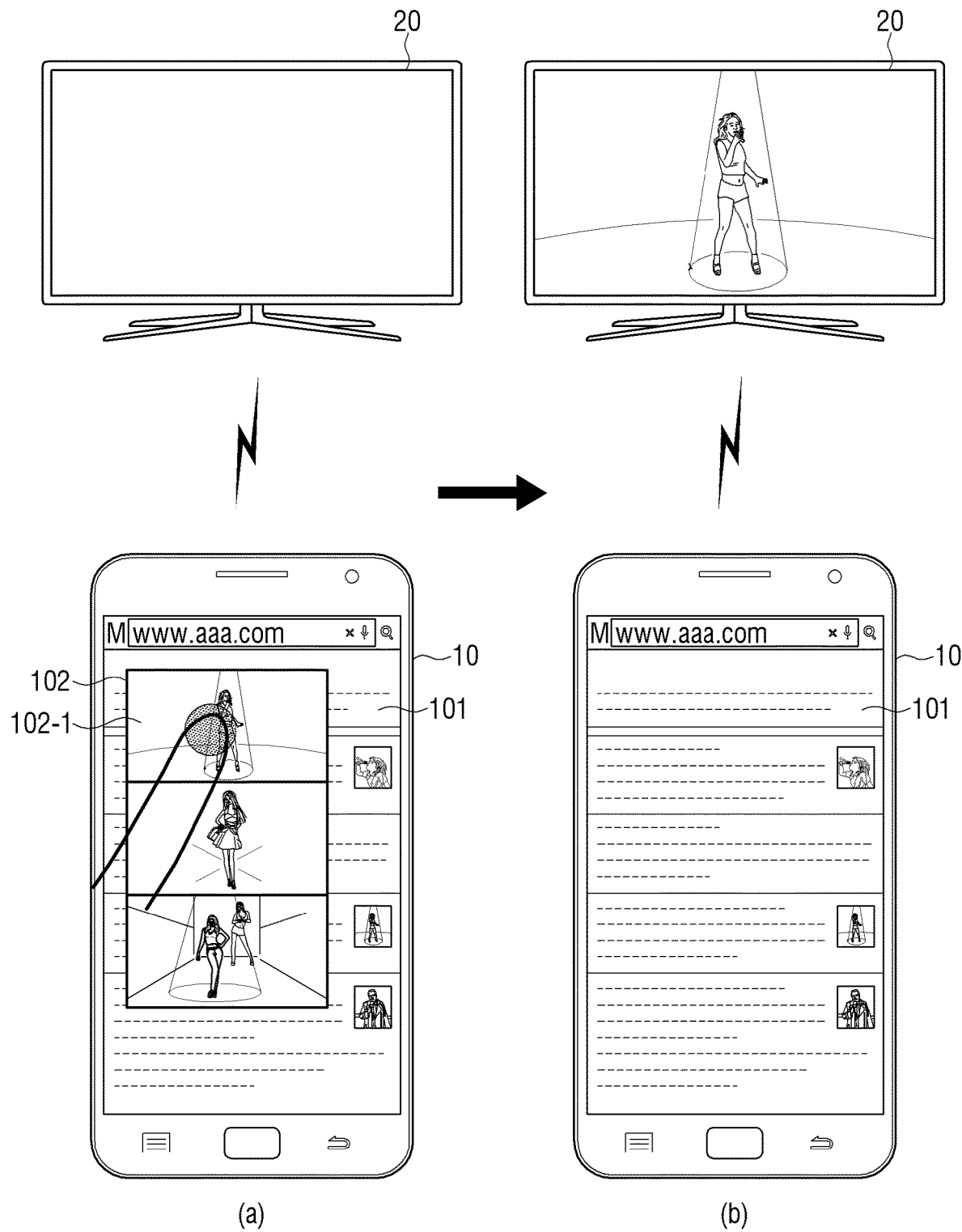
FIG. 1 is a diagram illustrating an electronic device sharing content with an external device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Hereinafter, terms used in the following description are described briefly in advance of the embodiments of the present disclosure.

The terms used herein are widely used common expressions selected in consideration of functions in the present disclosure. However, such terms may vary depending upon intentions of a person having ordinary skill in the art, judicial precedents, or the development of new technologies. Accordingly, the terms used herein should be defined based on the meanings of the terms and overall descriptions of the present disclosure.

A term including an ordinal, for example, "first" or "second", may be used to distinguish elements, but the elements are not limited by the ordinal. The ordinal is used to only distinguish the same or similar elements.

A term in a singular form includes a plural form unless it is intentionally written that way. Further, terms, such as, "include", "consist of", and "the like", refer to the disclosed features, numbers, steps, operations, elements, parts, or combinations thereof, and are not intended to exclude the existence or addition of one or more other features, numbers, steps, operations, elements, parts, or combinations thereof.

Herein, the terms "module" and "unit" refer to an element that performs at least one function or operation. The module or unit may be realized as hardware, software, or combinations thereof. A plurality of modules, units, or parts may be integrated into at least one module or chip, and realized as at least one processor, except for a case where respective modules or units need to be realized as discrete specific hardware.

When it is described that one part is connected to another part, the connection may be a direct connection of the parts or an electrical connection through another medium. Further, the expression that a part includes a certain element signifies that the part may include additional elements, unless otherwise described.

Herein, the term "user input" may include at least one of a touch input, a bending input, a voice input, a button input, a motion input, and a multimodal input, but is not limited thereto.

A touch input may include a touch gesture performed by a user with respect to a display and a cover of a device to control the device. Further, the touch input may include an input that does not come in contact with the display, but is within a certain distance from the display (e.g., floating or hovering). The touch input may include, for example, a touch & hold gesture, a tap gesture (touch and release), a double tap gesture, a panning gesture, a flick gesture, a touch & drag gesture (touch and move in a certain direction), a pinch gesture, or the like, but is not limited thereto.

A button input refers to a user input for controlling the device using a physical button on the device.

A motion input refers to a user motion performed with respect to the device to control the device. By way of example, the motion input may include user inputs of rotating, tilting, or moving the device in a vertical and/or horizontal direction.

A multimodal input refers to an input where at least two or more input methods are combined. For example, the device may receive a touch input and a motion input or may receive a touch input and a voice input from the user.

Herein, an application refers to a series of computer program sets configured to execute particular jobs. According to the embodiments disclosed herein, diverse types of applications may be provided. For example, the application may include a game application, a video reproducing application, a map application, a memo application, a schedule application, a phone-book application, a broadcasting application, an exercise support application, a payment application, a picture-folder application, a medical device-control application, an application for providing UIs for a plurality of medical devices, or the like, but is not limited thereto.

Herein, application identification information may be unique information for distinguishing a certain application from other applications. For example, the application identification information may be an icon, an index item, link information, or the like, but is not limited thereto.

A user interaction element refers to an element providing visual, auditory, or olfactory feedback according to a user input through interaction with the user.

Further, a term user may refer to a person using an electronic device or a device using the electronic device (e.g., an electronic device with artificial intelligence).

FIG. 1 is a diagram illustrating an electronic device sharing content with an external device, according to an embodiment of the present disclosure.

Referring to FIG. 1, an electronic device 10 may be realized as one of a smart phone, a tablet PC, a mobile phone, a video phone, an e-book reader, a desktop PC, a laptop PC, a netbook computer, a workstation, a server, a PDA, a portable multimedia player (PMP), an MP3 player, a mobile medical device, a camera, and a wearable device, for example. According to various embodiments, the wearable device may include at least one of accessory-type devices (e.g., watches, rings, bracelets, anklets, necklaces, eye glasses, contact lens, head-mounted devices (HMDs), or the like), clothes-integrated devices (e.g., electronic clothing), body-mounted devices (e.g., skin pads or tattoos), or bio-implantable devices (e.g., implantable circuits).

According to another embodiment, the electronic device 10 may be realized as a home appliance. For example, the home appliance may include at least one of a TV, a digital versatile disc (DVD) player, a stereo system, a refrigerator, an air conditioner, a vacuum cleaner, an oven, a microwave oven, a washing machine, an air purifier, a set-top box, a home automation control panel, a security control panel, a TV box, a game console, an electronic dictionary, an electronic key, a camcorder, or an electronic picture frame.

According to another embodiment, the electronic device 10 may be realized as one of various medical devices (e.g., various kinds of portable medical measuring devices (a blood glucose measuring device, a heart rate monitor, a blood pressure measuring device, a thermometer, or the like), a magnetic resonance angiography (MRA) unit, a magnetic resonance imaging (MRI) unit, a computed tomography (CT) unit, an ultrasound unit), navigation, a global navigation satellite system (GNSS), an event data recorder (EDR), a flight data recorder (FDR), an automotive infotainment device, a marine electronic device (e.g., a naval navigation system, a gyro compass, or the like), aviation electronics (avionics), security equipment, a head unit for vehicle, an industrial robots, a home robot, an automated teller machine (ATM) of banking facilities, point-of-sales terminals (POS) of shops, or an Internet of Things (IoT) device (e.g., a light bulb, diverse sensors, an electric meter, a gas meter, a sprinkler, a fire alarm, a temperature control system (thermostat), a streetlamp, s toaster, sporting goods, a hot-water tank, a heater, a boiler, or the like).

According to still another embodiment, the electronic device 10 may be realized as one of a part of furniture, a building, or a structure, an electronic board, an electronic signature receiving device, a projector, or diverse measuring equipment (e.g., a water meter, an electric meter, a gas meter, a radio wave meter, or the like).

According to still another embodiment, the electronic device 10 may be realized as a combination of one or more devices described above.

According to still another embodiment, the electronic device 10 may be realized as a flexible electronic device. The electronic device 10 is not limited to the above-described examples and may include new electronic devices according to the development of the electronic technologies.

Hereinafter, the operations of the electronic device 10 will be described based on an example of a smart phone.

In FIG. 1, an external device 20 may be a device capable of reproducing or displaying the content. For example, the external device 20 may be realized as one of a video reproducing device, an image display device, a text display device, or an audio reproducing device. The external device 20 may be realized as a combination of at least two or more devices described above.

The video reproducing device or the image display device may include at least one of a TV, an electronic picture frame, a smart phone, a tablet PC, a mobile phone, a video phone, a desktop PC, a laptop PC, a netbook computer, a PDA, PMP, a camera, or a wearable device, for example.

The audio reproducing device may include at least one of a stereo system, an MP3 player, a speaker, a TV, a smart phone, a tablet PC, a mobile phone, a video phone, a desktop PC, a laptop PC, a netbook computer, a PDA, a PMP, or a wearable device, for example.

The text display device may include at least one of an e-book reader, a TV, an electronic picture frame, a smart phone, a tablet PC, a mobile phone, a video phone, a desktop PC, a laptop PC, a netbook computer, a PDA, a PMP, a camera, or a wearable device, for example.

In FIG. 1, the electronic device 10 may receive and display an electronic document 101 (e.g., web document) including a plurality of contents.

The content may be audio content, a video, text, or images, for example. The content may be a link address designating a location where the content is stored, for example, uniform resource locator (URL). That is, the content may be an audio link address, a video link address, a text link address, or an image link addresses. The content may be a thumbnail of the content. That is, the content may be a video thumbnail, a text thumbnail, or an image thumbnail. As an example, the content may consist of two or more types of contents described above. As another example, the content may include both the video thumbnail and the video link address.

In FIG. 1, the operations of the electronic device 10 are described based on an example where the content is a video link address.

The electronic device 10 may acquire function information on the external device 20 capable of communicating with the electronic device 10.

The function information on the external device 20 may be information indicating a function executable in the external device 20. Further, the function information on the external device 20 may be information indicating a function executed mainly by the external device 20. By way of example, the function information on a stereo system may indicate an audio reproducing function, and the function information on a TV may indicate a video reproducing function or an image display function. The function information on the e-book reader may indicate a text display function. In the embodiments described herein, the function information on the external device 20 may be referred to as a profile of the external device 20.

When there are a plurality of external devices 20 communicating with the electronic device 10, the function information on one external device 20 may be information indicating a function with relatively higher performance in the external device as compared with other external devices. As an example, when one external device 20 among the plurality of external devices 20 is a stereo system, and another external device 20 is a TV, the function information on the stereo system may indicate the audio reproducing function. The TV may reproduce both the audio and the video, but the performance of the audio reproducing function of the TV is relatively lower than the performance of the video reproducing function. Accordingly, the function information on the TV may indicate the video reproducing function.

The electronic device 10 may acquire the function information on the external device 20 from a memory. In this case, the function information may be pre-stored in the memory in a manufacturing process of the electronic device 10. Further, the function information may be acquired and pre-stored from a server or from the external device 20. In response to receiving a user input for reproducing the content in the external device 20, the electronic device 10 may acquire the function information from the server or from the external device 20. In response to the electronic device 10 communicating with the external device 20, the electronic device 10 may acquire the function information from the external device 20.

The electronic device 10 may determine at least one piece of content executable in the external device 20 from among the plurality of pieces of contents included in the electronic document 101, based on a type of the plurality of contents and the function information on the external device 20.

For example, the plurality of contents may include the video link address, the audio link address, and the text link address. In this case, a type of the content corresponding to the video link address may be the video, a type of the content corresponding to the audio link address may be the audio, and a type of the content corresponding to the text link address may be the text.

According to an embodiment, in response to the external device 20 being realized as a TV, and the function information on the TV indicating the video reproducing function, the content determined to be executed in the TV may be the video link address.

According to another embodiment, in response to the external device 20 being realized as a stereo system, and the function information on the stereo system indicating the audio reproducing function, the content determined to be executed in the stereo system may be the audio link address.

According to still another embodiment, in response to the external device 20 being realized as an e-book reader or a tablet PC, and the function information on the e-book reader or the tablet PC indicating the text display function, the content determined to be executed in the e-book reader or the tablet PC may be the text.

In response to at least one content executable in the external device 20 being determined from among the plurality of contents, as illustrated in (a) of FIG. 1, the electronic device 10 displays a content list 102 including at least one piece of content representative information corresponding to the at least one determined content. The content list 102 may be displayed in a screen of the electronic device 10 in the form of a pop-up window or may be displayed in the form of a floating pop-up window that is movable by a user's touch & drag input. Further, the content list 102 may reduce a size of the web document and may be displayed in an area generated by the reduction of the web document. That is, the content list 102 may be displayed in an area different from an area where the web document is displayed.

The content representative information may be a thumbnail, a title, contents, or details of content, for example.

For example, in response to the external device 20 being realized as a TV, and at least one content determined to be executed in the TV being the video link address, the content representative information corresponding to the content may include a thumbnail of a video, a part of the video, a title of the video, a synopsis of the video, characters of the video, a producer of the video, or the like. The content representative information corresponding to the content may be acquired from the electronic document 101 or the server.

In response to the content list 102 being displayed, the electronic device 10 senses a user input of selecting at least one piece of content representative information 102-1 from the content list 102.

In response to the at least one piece of content representative information 102-1 being selected, the electronic device 10 transmits information on the content corresponding to the selected content representative information 102-1 to the external device 20. By way of example, in response to the selected content representative information 102-1 being a thumbnail of a video, the electronic device 10 may transmit information including a video link address of the video to the external device 20.

In response to the information on the content being transmitted to the external device 20, as illustrated in (b) of FIG. 1, the external device 20 reproduces the content based on the received content. For example, in response to the received content being a video link address, the external device 20 may acquire the video indicated by the video link address by accessing the server, and reproduce the acquired video.

Figure 2:
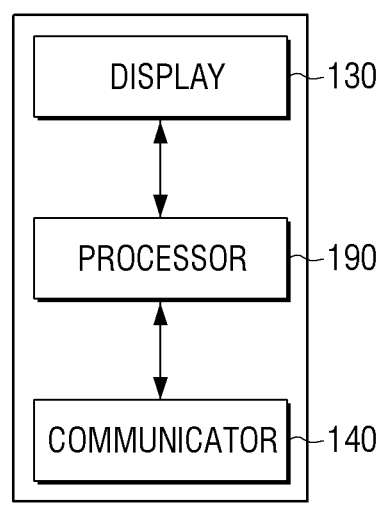
FIG. 2 is a block diagram illustrating a structure of an electronic device, according to an embodiment of the present disclosure.

FIG. 2 is a block diagram illustrating a structure of an electronic device, according to an embodiment of the present disclosure.

Referring to FIG. 2, the electronic device 10 includes a display 130, a communicator 140, and a processor 190.

The display 130 may display a web document including a plurality of pieces of content. According to an embodiment, the display 130 may display a content list including at least one piece of content representative information corresponding to at least one determined piece of content.

The display 130 may display a UI for controlling the content transmitted to an external device.

The communicator 140 may communicate with an external device 20 located outside the electronic device 20 according to various types of communication methods. Further, the communicator 140 may transmit information on the content determined in the processor 190 to the external device 20. In the operation where the communicator 140 transmits the information on the content to the external device 20, the information on the content may be directly transmitted to the external device 20 or the information on the content may be indirectly transmitted to the external device 20 indirectly. For example, the communicator 140 may transmit the information on the content to the external device 20 through another external device, an access point (AP), or a base station.

The processor 190 may determine at least one piece of content executable in the external device 20, from among the plurality of pieces of content included in the web document, based on a type of the plurality of pieces of content and the function information on the external device 20. Further, the processor 190 may control the communicator 140 so as to transmit the information on the determined content to the external device 20.

According to an embodiment, the processor 190 may generate a template file including the at least one determined piece of content, and may transmit the generated template file to the external device 20 through the communicator 140.

The processor 190 may generate a content list including the content representative information corresponding to the at least one piece of content, and may transmit the generated content list to the external device 20 through the communicator 140.

In response to one piece of content representative information being selected from the content list, the processor 190 may transmit information on content corresponding to the selected content representative information to the external device 20 through the communicator 140.

The processor 190 may receive another web document related to the received web document through the communicator 140. In this case, the processor 190 may determine at least one piece of content executable in the external device 20 from among a plurality of pieces of contents included in the other web document. Further, the processor 190 may transmit information on the at least one determined piece of content to the external device 20 through the communicator 140.

Figure 3:
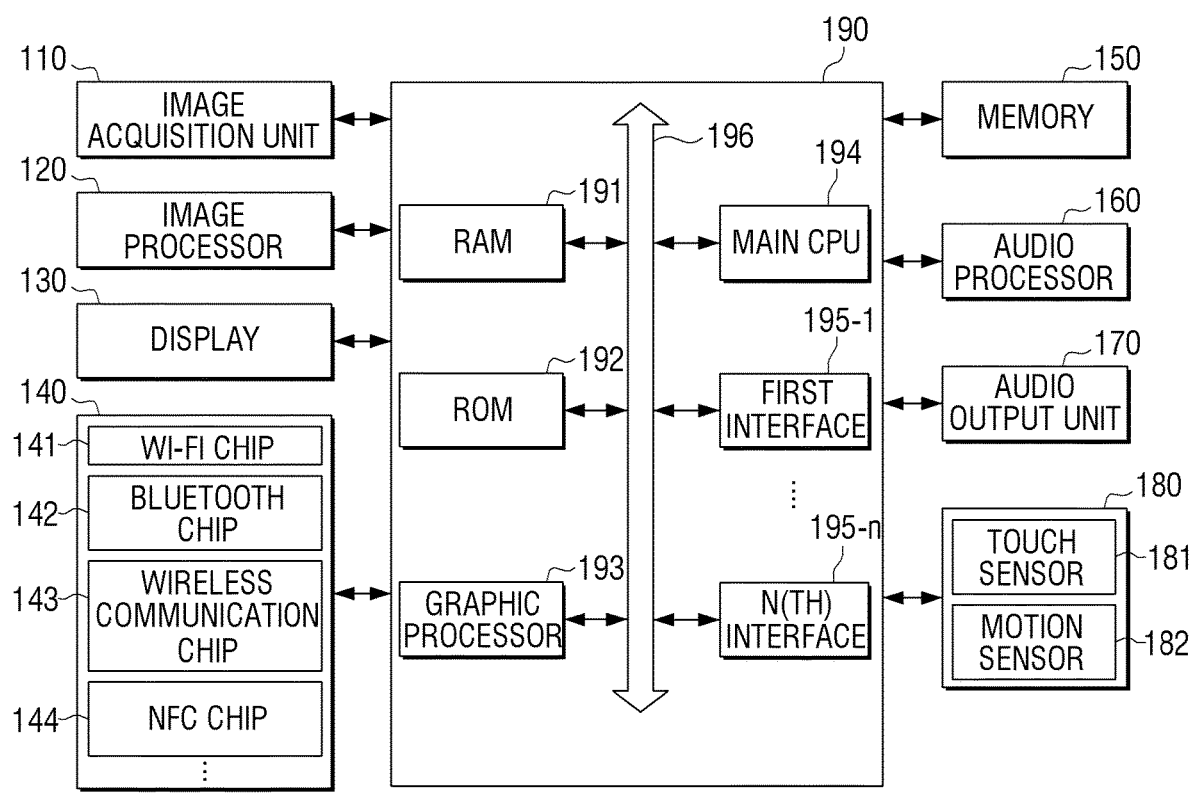
FIG. 3 is a block diagram illustrating a structure of an electronic device, according to another embodiment of the present disclosure.

FIG. 3 is a block diagram illustrating a structure of an electronic device, according to another embodiment of the present disclosure.

Referring to FIG. 3, the electronic device 10 includes at least one of an image acquisition unit 110, an image processor 120, a display 130, a communicator 140, a memory 150, an audio processor 160, an audio output unit 170, a sensor 180, and a processor 190. The structure of FIG. 3 is only an example for illustrative purposes, and the structure of the electronic device 10 is not limited thereto. Accordingly, a part of the components of the electronic device 10 may be omitted or modified, or a new element may be added according to a type or a purpose of the electronic device 10.

The image acquisition unit 110 may acquire image data from diverse sources. For example, the image acquisition unit 110 may receive the image data from an external server or a device located outside the electronic device 10.

Further, image acquisition unit 110 may acquire the image data by photographing an external environment. For example, the image acquisition unit 110 may be realized as a camera for photographing the external environment of the electronic device 10. In this case, the image acquisition unit 110 may include a lens through which an image passes and an image sensor for sensing the image. The image sensor may be realized as a charge-coupled device (CCD) image sensor or a complementary metal oxide semiconductor (CMOS) image sensor. The image data acquired by the image acquisition unit 110 may be processed by the image processor 120.

The image processor 120 processes the image data acquired by the image acquisition unit 110. The image processor 120 may perform various image-processing operations for the image data, such as, for example, decoding, scaling, noise filtering, frame rate conversion, resolution conversion, and so on.

The display 130 displays a video frame obtained from the image data processed by the image processor 120 or various screens generated by a graphic processor 193, in a display area.

The display 130 may be realized in various sizes. By way of example, the display 130 may have sizes of 3 inches, 4 inches, 4.65 inches, 5 inches, 6.5 inches, 8.4 inches, or the like. The display 130 may consist of a plurality of pixels. In this case, a value obtained by multiplying the number of pixels in columns by the number of pixels in rows may be expressed as resolution. For example, the display 130 may have various resolutions, such as 320×320, 360×480, 720×1280, 1280×800, 3940×2160, or the like.

The display 130 may be realized as a flexible display and mounted on at least one of a front area, a side area, and a rear area of the electronic device 10. The flexible display refers to a display that may be bent or rolled without damage through a paper-thin and flexible substrate. The flexible display may be manufactured using a plastic substrate, as well as a glass substrate which is commonly used. When the flexible display is made of the plastic substrate, a low-temperature manufacturing process may be employed instead of the conventional manufacturing process in order to prevent damage to the substrate. Further, the glass substrate enclosing flexible liquid crystal may be replaced with a plastic film such that the flexible display may be folded or unfolded with flexibility. The flexible display is thin, light, and robust to impacts. Further, the flexible display may be bent and realized as various forms.

The display 130 may be realized as a touch screen in a layer structure in combination with a touch sensor 181. The touch screen may provide functions of sensing a location of a touch input, a touched dimension, and pressure of the touch input, as well as a display function. The touch screen may further provide functions of sensing a real touch and a proximity touch. Further, the touch screen may provide functions of sensing a user's finger touch and various types of pen touch.

The communicator 140 communicates with various types of external devices according to diverse communication methods. The communicator 140 may include at least one of a Wi-Fi chip 141, a Bluetooth chip 142, a wireless communication chip 143, and a near field communication (NFC) chip 144. The processor 190 may perform communication with the external server or various external devices through the communicator 140.

The Wi-Fi chip 141 and the Bluetooth chip 142 may perform communication according to a Wi-Fi method and a Bluetooth method, respectively. In the case of the Wi-Fi chip 141 and the Bluetooth chip 142, various connection information, such as, subsystem identification (SSID), a session key, or the like, may be transmitted and/or received first for communication connection, and then diverse information may be transmitted and/or received. The wireless communication chip 143 refers to a chip that performs the communication according to various communication standards including Institute of Electrical and Electronics Engineers (IEEE), Zigbee, 3rd Generation (3G), 3rd Generation Partnership Project (3GPP), Long Term Evolution (LTE), and so on. The NFC chip 144 refers to a chip that operates according to an NFC method using a 13.56 MHz band among various radio frequency-identification (RF-ID) frequency bands including 135 kHz, 13.56 MHz, 433 MHz, 860 to 960 MHz, 2.45 GHz, and so on.

The memory 150 may store various programs and data necessary for the operations of the electronic device 10. The memory 150 may be realized as a non-volatile memory, a volatile memory, a flash memory, a hard disk drive (HDD), a solid state drive (SSD), or the like. The memory 150 may be accessed by the processor 190, and the data in the memory 150 may be read, recorded, modified, deleted, or updated by the processor 190. In the embodiments disclosed herein, the term "memory" may refer to the memory 150, a read-only memory (ROM) 192, or a random access memory (RAM) 191 in the processor 190, or a memory card mounted on the electronic device 10 (e.g., a micro SD card or a memory stick).

Further, the memory 150 may store the programs and data for configuring various screens to be displayed in the display area of the display 130.

Figure 4:
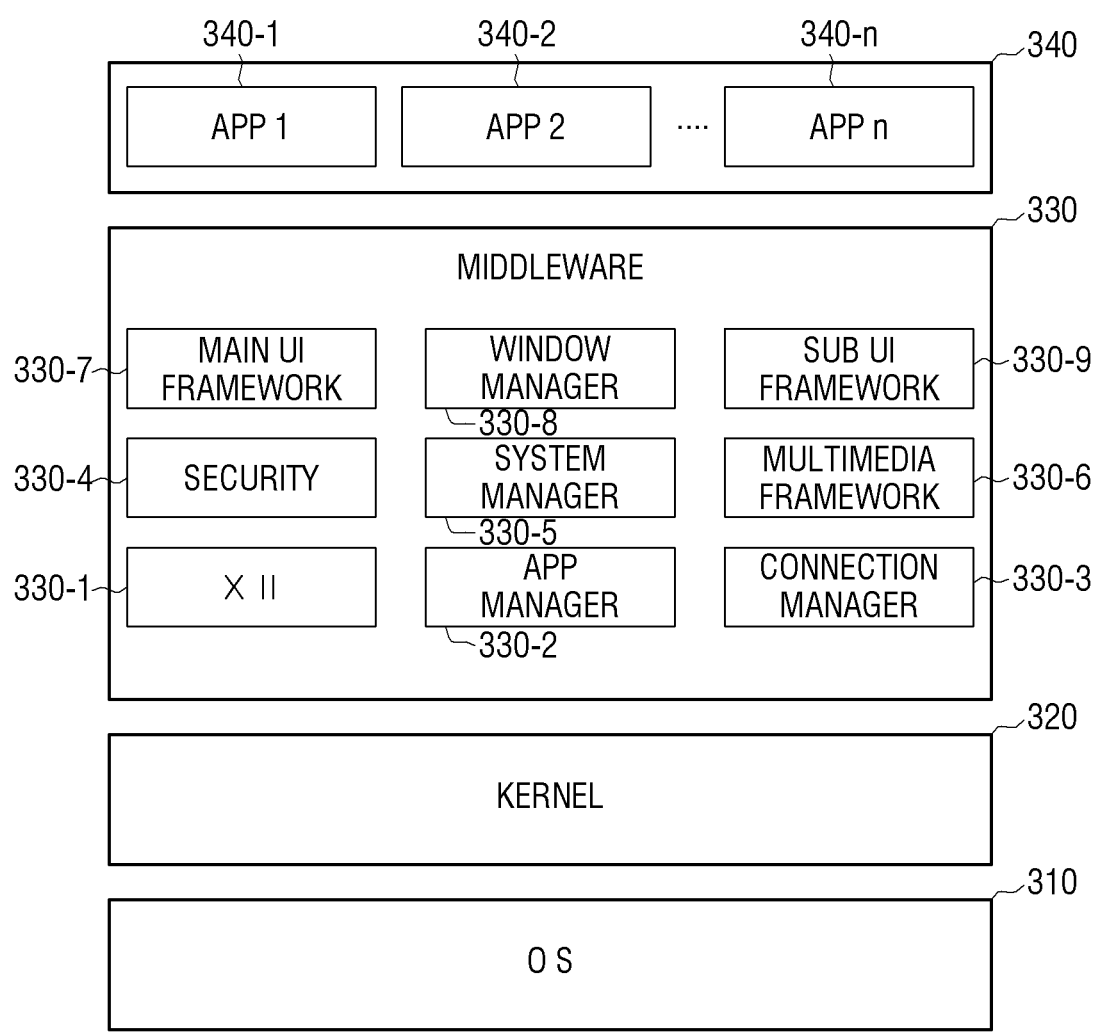
FIG. 4 is a diagram illustrating a configuration of software stored in an electronic device, according to an embodiment of the present disclosure.

Hereinafter, a configuration of software in the memory 150 is described with reference to FIG. 4. Referring to FIG. 4, the memory 150 may store the software including an operating system (OS) 310, a kernel 320, a middleware 330, and an application 340.

The OS 310 controls and manages overall operations of hardware. In other words, the OS 310 is a hierarchy that performs basic functions, such as, hardware management, a memory function, security, or the like.

The kernel 320 serves as a path for transmitting various signals including a touch signal sensed by the sensor 180 to the middleware 330.

The middleware 330 includes various software modules for controlling the operations of the electronic device 10. Referring to FIG. 4, the middleware 330 includes an XI module 330-1, an APP manager 330-2, a connection manager 330-3, a security module 330-4, a system manager 330-5, a multimedia framework 330-6, a main UI framework 330-7, a window manager 330-8, and a sub UI framework 330-9.

The X11 module 330-1 receives various event signals from diverse hardware in the electronic device 10. Herein, an event may be set variously, ranging from an event where a user gesture is sensed, an event where a system alarm occurs, an event where a particular program is executed or terminated, or the like.

The APP manager 330-2 manages an execution status of various applications 340 installed in the memory 150. In response to an application execute event being sensed in the X11 module 330-1, the APP manager 330-2 calls and executes an application corresponding to the sensed event.

The connection manager 330-3 supports the wired and/or wireless network connection. The connection manager 330-3 may include various specific modules, such as, a DNET module, a universal plug and play (UPnP) module, or the like.

The security module 330-4 supports certification, permission, or secure storage with respect to the hardware.

The system manager 330-5 monitors a status of each component of the electronic device 10 and provides other modules with the monitoring result. For example, when there is not enough battery, an error occurs, or the communication connection is cut off, the system manager 330-5 may provide the main UI framework 330-7 or the sub UI framework 330-9 with the monitoring result so as to output an alarm message or an alarm sound.

The multimedia framework 330-6 reproduces multimedia contents stored in the electronic device 10 or provided from the external source. The multimedia framework 330-6 may include a player module, a camcorder module, a sound processing module, or the like. Accordingly, the multimedia framework 330-6 may generate and reproduce the screens and sounds by reproducing various multimedia contents.

The main UI framework 330-7 provides various UIs to be displayed in a main area of the display 130. The sub UI framework 330-9 provides various UIs to be displayed in a sub area of the display 130. The main UI framework 330-7 and the sub UI framework 330-9 may include an image compositor module for configuring various UI elements, a coordinate compositor for calculating coordinates where the UI objects are displayed, a rendering module for rendering the configured UI objects on the calculated coordinates, a two-dimensional (2D)/three-dimensional (3D) UI toolkit for providing tools for configuring a 2D UI or 3D UI, or the like.

The window manager 330-8 may sense a touch event using a user's body or a pen and other input events. In response to the event being sensed, the window manager 330-8 transmits an event signal to the main UI framework 330-7 or the sub UI framework 330-9 so as to perform an operation corresponding to the event.

Further, the electronic device 10 may further include diverse program modules including a writing module for drawing lines according to a drag trace of a user's touch & drag input or an angle calculating module for calculating a pitch angle, a role angle, or a yaw angle based on a sensing value of a motion sensor 182.

The application module 340 includes applications 340-1 to 340-n for supporting various functions. For example, the application module 340 may include the program modules for providing diverse services, such as, a navigation program module, a game module, an e-book module, a calendar module, an alarm management module, or the like. The applications may be installed by default or installed arbitrarily by the user. In response to a UI object being selected, a main central processing unit (CPU) 194 may execute an application corresponding to the selected UI object by using the application module 340.

The configuration of FIG. 4 is only an example, and the configuration of the software is not limited thereto. Accordingly, some of the above components may be omitted or modified, or a new element may be added according to the type or the purpose of the electronic device 10. For example, the memory 150 may additionally store various programs, such as, a sensing module for analyzing signals sensed by various sensors, a messaging module including a messenger program, a text message program, or an e-mail program, a call info aggregator program module, a voice over Internet protocol (VoIP) module, a web browser module, or the like.

Referring back to FIG. 3, the audio processor 160 processes audio data of the image content. The audio processor 160 may perform various processing operations for the audio data, such as, for example, decoding, amplification, or noise filtering. The audio data processed by the audio processor 160 may be output to the audio output unit 170.

The audio output unit 170 outputs various audio data which is processed in many ways, such as decoding, amplification, and noise filtering by the audio processor 160, various alarm sounds, and voice messages. Specially, the audio output unit 170 may be realized as a speaker, but this is only an example, and the audio output unit 170 may be realized as an output terminal for outputting audio data.

The sensor 180 senses various user interactions. The sensor 180 may sense at least one of various changes of the electronic device 10, such as, change of posture, change of illuminance, change of acceleration, or the like, and transmit an electrical signal corresponding to the sensing result to the processor 190. That is, the sensor 180 may sense a state change related to the electronic device 10, generate a sensing signal corresponding to the sensing result, and transmit the generated sensing signal to the processor 190. In this embodiment, the sensor 180 may include various sensors. As power is supplied to at least one sensor predetermined by control of the sensor 180 (or based on a user setting) when the electronic device 10 is driven, the sensor 180 may sense the state change of the electronic device 10.

The sensor 180 may consist of various sensors and may include at least one of all kinds of sensing devices capable of sensing the state change of the electronic device 10. For example, the sensor 180 may include at least one of a touch sensor, an acceleration sensor, a gyro sensor, an illuminance sensor, a proximity sensor, a pressure sensor, a noise sensor (e.g., microphone), a video sensor (e.g., camera module), a pen sensor, a timer, or the like.

The sensor 180 may be classified into a touch sensor 181 and a motion sensor 182, according to a purpose, but is not limited thereto. The sensor 180 may be classified according to additional purposes, which does not signify physical classification. The functions of the touch sensor 181 and the motion sensor 182 may be performed by a combination of at least one sensor. Further, a part of the structure or the functions of the sensor 180 may be included in the processor 190.

The touch sensor 181 may sense a user's finger input and output a touch event value corresponding to the sensed touch signal. A touch panel of the touch sensor 181 may be mounted under the display 130. The touch sensor 181 may sense the user's finger input according to a capacitive type method and a pressure-resistive type method. The capacitive type method refers to a method of calculating touch coordinates by sensing micro electricity excited into a user's body. The pressure-resistive type method refers to a method of calculating touch coordinates by sensing a current flow at a touched point that occurred in response to a contact between an upper electrode plate and a lower electrode plate embedded in the touch panel.

The touch sensor 181 may acquire output signals according to the user input from the touch sensor 181. The touch sensor 181 may obtain user input information including a touch location, a touch coordinate, the number of touches, a touch strength, a cell ID, a touch angle, a touch dimension, or the like, based on values of the output signals and determine a type of the touch input based on the obtained user input information. In this case, the touch sensor 181 may determine the type of the touch input using a touch recognition algorithm panel or touch pattern data in a memory. In response to determining the type of the touch input, the touch sensor 181 may transmit information on the type of the touch input to the processor 190. As described above, the touch sensor 181 may sense a location of a proximity touch (or location of hovering) inputted by the user.

In this case, the processor 190 may perform a part of the functions of the touch sensor 181. For example, the touch sensor 181 may transmit the signal values acquired from the touch sensor or the user input information obtained from the signal values to the processor 190. The processor 190 may determine the type of the touch input based on the received signal values, user input information, the touch recognition algorithm, or the touch panel or touch pattern data in the memory 150. For example, in response to a call application being executed, the processor 190 may sense that a call button of the call application was selected from the user input information or the type of the touch input and transmit a call to a call partner through the communicator 140.

The motion sensor 182 may sense a motion of the electronic device 10 (e.g., rotation motion, tilting motion, or the like) using at least one of an acceleration sensor, a tilt sensor, a gyro sensor, and a 3-axis magnetic sensor. Further, the motion sensor 182 may transmit a generated electrical signal to the processor 190. For example, the motion sensor 182 measures the acceleration where motion acceleration and gravitational acceleration of the electronic device 10 are combined, but when there is no motion of the electronic device 10, measures only the gravitational acceleration.

By way of example, assuming that the motion sensor 182 uses the acceleration sensor, the motion sensor 182 may measure the gravitational acceleration for each of an X-axis, a Y-axis, and a Z-axis with reference to the electronic device 10. In this case, it is assumed that an upward direction of a front surface of the electronic device 10 refers to a positive (+) direction of the gravitational acceleration, and an upward direction of a rear surface of the electronic device 10 refers to a negative (−) direction of the gravitational acceleration. In response to the rear surface of the electronic device 10 being placed in contact with a horizontal surface, elements of the X-axis and Y-axis in the gravitational acceleration sensed by the motion sensor 182 are measured to be '0 m/sec2,' and only an element of the Z-axis may be measured to be a particular positive value (e.g., +9.8 m/sec2). By contrast, in response to the front surface of the electronic device 10 being placed in contact with the horizontal surface, the elements of the X-axis and Y-axis in the gravitational acceleration sensed by the motion sensor 182 are measured to be '0 m/sec2,' and only the element of the Z-axis may be measured to be a particular negative value (e.g., −9.8 m/sec2). Further, assuming that the electronic device 10 is placed in a tilted manner with respect to a surface of a table, the element of at least one axis in the gravitational acceleration sensed by the motion sensor 182 may be measured to be a value that is not '0 m/sec2.' In this case, the square root of a sum of squares of the elements of the three axes, that is, a size of the vector sum may be the particular value (e.g., 9.8 m/sec2). In this case, the motion sensor 182 may sense the acceleration of each direction of the X-axis, the Y-axis, and the Z-axis in a coordinate system. The respective axes and the corresponding gravitational acceleration may vary depending upon a location of a sensor, needless to say.

The sensor 180 may further include a pen sensor (e.g., pen recognition panel). The pen sensor may sense a user's pen input using a touch pen (e.g., stylus pen, digitizer pen, or the like) and output a pen proximity event value or a pen touch event value. The pen sensor may be realized according to an EMR method, for example. The pen sensor may sense a touch input or a proximity input according to variation of intensity of an electromagnetic field by the pen proximity or the pen touch. Particularly, the pen recognition panel may include an electromagnetic induction coil sensor in a grid structure and an electronic signal processor for sequentially transmitting alternating current signals with certain frequency to loop coils of the electromagnetic induction coil sensor. In response to a resonant circuit-embedded pen being located around the loop coils of the pen recognition panel, a magnetic filed transmitted from the loop coils generates the current based on mutual electromagnetic induction in the resonant circuit of the pen. Accordingly, an induction magnetic field is generated from the coils of the resonant circuit of the pen based on the current. The pen recognition panel may detect the induction magnetic filed from the loop coils in a signal reception state, thereby sensing an access location or a touch location of the pen.

The microphone may receive a user voice for controlling a medical device (e.g., instructions to start, stop, or quit a photographing operation) through the electronic device 10 and recognize the user voice through a voice recognition module. Further, the microphone may transmit the recognized result to the processor 190. In this case, the voice recognition module may be located at a part of the processor 190 instead of the microphone, or may be located outside the electronic device 10.

The processor 190 may control the overall operations of the electronic device 10 using the various programs stored in the memory 150.

The processor 190 includes a RAM 191, a ROM 192, a graphic processor 193, a main CPU 194, first to n(th) interfaces 195-1 to 195-n, and a bus 196. The RAM 191, the ROM 192, the graphic processor 193, the main CPU 194, and the first to n(th) interfaces 195-1 to 195-n may be interconnected through the bus 196.

The RAM 191 stores the OS and the application programs. Specifically, in response to the electronic device 10 being booted up, the OS may be stored in the RAM 191, and various application data selected by the user may be stored in the RAM 191.

The ROM 192 stores a command set for system booting. In response to the power being supplied by a turn-on command, the CPU 194 copies the OS in the memory 150 to the RAM 192 according to the commands stored in the ROM 192, and boots up the system by executing the OS. Upon completion of the boot-up operation, the CPU 194 copies the various application programs in the memory 150 to the RAM 191 and executes the programs copied to the RAM 191 to perform various operations.

The graphic processor 193 generates a screen including various objects, such as, icons, images, or text, by using a computing unit and a rendering unit. The computing unit computes attribute values, such as, coordinate values, shapes, sizes, and colors of the objects, according to a layout of the screen based on the received control command received from the sensor 180. The rendering unit generates a screen with various layouts including objects based on the attribute values computed by the computing unit. The screen generated by the rendering unit may be displayed in the display area of the display 130.

The main CPU 194 accesses the memory 150 and performs a boot-up operation by using the OS in the memory 150. Further, the main CPU 194 performs various operations using diverse programs, contents, and data stored in the memory 150.

The first to n(th) interfaces 195-1 to 195-n are connected to the aforementioned components. One of the interfaces 195-1 to 195-n may be realized as a network interface connected to the external device through a network.

FIG. 5 and FIGS. 6A to 6C are diagrams illustrating an electronic device sharing content with an external device, according to embodiments of the present disclosure.

Referring to (a) of FIG. 5, the processor 190 may control the communicator 140 to receive an electronic document 501 (e.g., web document) including a plurality of contents from a server. Subsequently, the processor 190 controls the display 130 to display the electronic document 501 by parsing the received electronic document 501. In this case, the electronic document 501 may be an electronic document that a user sought using a keyword.

The user may wish to view the contents included in the electronic document 501 using the external device 20 while viewing the electronic document 501 displayed in the display 130.

In this case, the sensor 180 senses a user input for displaying a panel 502 of the electronic device 10. The user input may be a user input of touching and dragging the screen of the electronic device 10 from a certain side (e.g., upper side) to a center of the electronic device 10.

In response to the user input, as illustrated in (b) of FIG. 5, the processor 190 controls the display 130 to display the panel 502 including a content-sharing execute icon 502-1. The panel may be displayed in a sliding manner in proportion to an amount of the user's touch & drag input. Subsequently, the sensor 180 may sense a user input of selecting the content-sharing execute icon 502-1.

In response to the user input, as illustrated in (c) of FIG. 5, the processor 190 controls the display 130 to display an external device list 503 including at least one external device connectable to the electronic device 10. The external device list 503 includes a plurality of pieces of external device identification information 503-1, 503-2, 503-3 corresponding to the at least one external device 20.

For example, in response to the electronic device 10 communicating with the external devices 20 in the Bluetooth method, and a Bluetooth function of the electronic device 10 being executed, the communicator 140 may transmit a power beacon signal to the external devices 20. In response to receiving the power beacon signal, the external devices 20 may transmit advertisement signals notifying that the external devices 20 may be connected. Accordingly, the plurality of pieces of external device identification information 503-1, 503-2, 503-3 corresponding to each of the external devices 20 that transmitted the advertisement signals may be included and displayed in the external device list 503. Subsequently, the sensor 180 may sense a user input of selecting the external device identification information 503-1 on an external device to share the contents.

Figure 6A:
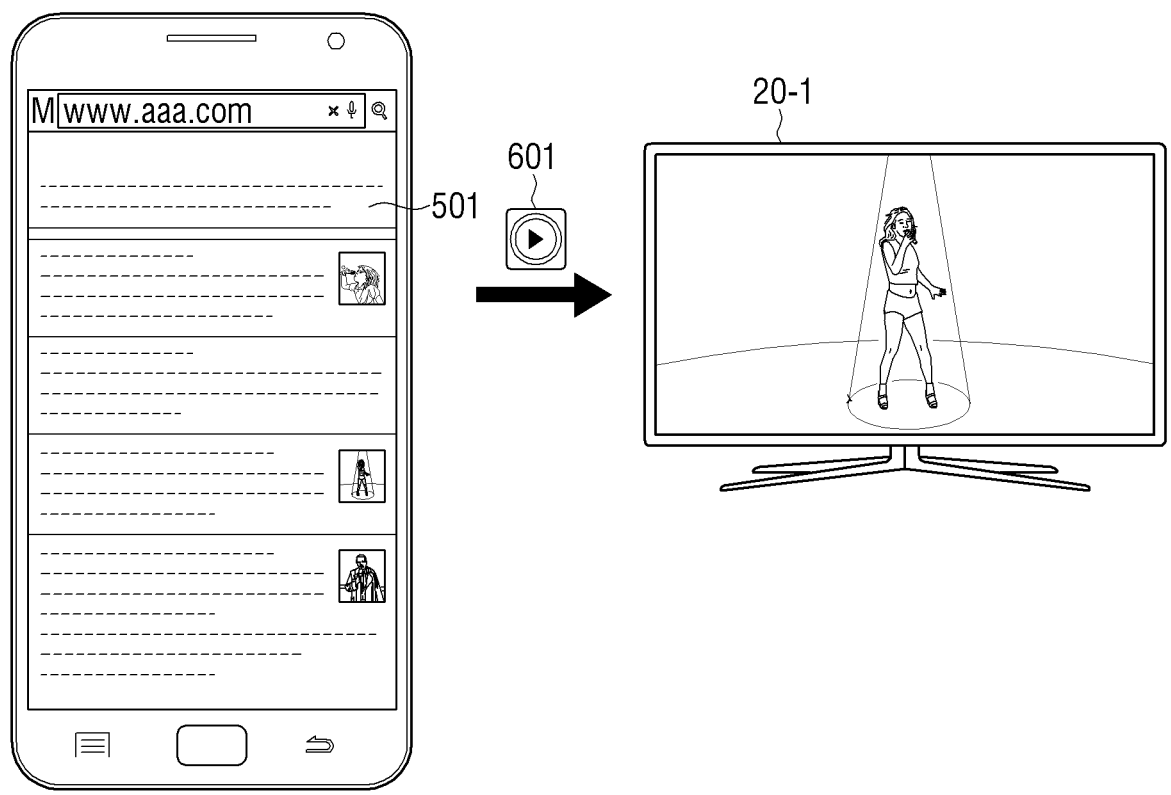

According to an embodiment, in (c) of FIG. 5, the user may select the external device identification information 503-1 corresponding to a video reproducing device 20-1 (e.g., a TV) that is capable of reproducing a video. In this case, as illustrated in FIG. 6A, the processor 190 may determine content executable in the video reproducing device 20-1 from among the plurality of pieces of content of the electronic document 501 based on the type of contents and the function information on the video reproducing device 20-1. By way of example, in response to the function information on the video reproducing device 20-1 indicating the video reproducing function, the processor 190 may determine at least one piece of content in a video type from among the plurality of pieces of content of the electronic document 501. To be specific, in response to the electronic document 501 being a web document searched by a keyword, a song title "Tears in Heaven," the processor 190 may determine a music video of the song "Tears in Heaven" or a link address of the music video as the content executable in the video reproducing device 20-1.

Further, the processor 190 may determine the content executable in the video reproducing device 20-1 from among a plurality of pieces of content included in another electronic document related to the electronic document 501. For example, the processor 190 may extract a keyword from the electronic document 501 and determine at least one piece of content in a video type from among the plurality of pieces of content of the other electronic document as the content executable in the video reproducing device 20-1 by using the extracted keyword. Further, the processor 190 may determine the content executable in the video reproducing device 20-1 from among a plurality of pieces of content of another electronic document indicated by a link address included in the electronic document 501 based on the type of the plurality of pieces of content and the function information on the video reproducing device 20-1.

According to an embodiment, in response to the at least one piece of content executable in the video reproducing device 20-1 being determined from among the contents of at least one of the electronic document 501 and the other electronic document, the processor 190 controls the communicator 140 to transmit information 601, including the determined video or the link address of the video, to the video reproducing device 20-1.

In response to the processor 190 determining at least one content executable in the video reproducing device 20-1, the processor 190 controls the display 130 to display a content list including at least one piece of content representative information corresponding to the at least one determined content. In this case, the processor 190 controls the communicator 140 to transmit the information 601 including the video corresponding to the content representative information selected by the user from the content list or the video link address of the video to the video reproducing device 20-1.

Further, the processor 190 may generate a content list including the content representative information corresponding to the at least one determined content. For example, in response to the content being a video or a video link address of the video, the content representative information may include at least one of a thumbnail of the video, a part of the video, a title of the video, a synopsis of the video, I-frame of the video, and details of the video (e.g., captions, characters, a scenario of the video, or the like), for example. The content representative information may be extracted from the electronic document 501 or other electronic document related to the electronic document 501.

In response to the content list being generated, the processor 190 may control the communicator 140 to transmit the generated content list to the video reproducing device 20-1.

The video reproducing device 20-1 may receive at least one of the content and the content representative information and reproduce the content based on the received content. For example, in response to the received content being a video, the video reproducing device 20-1 may reproduce the video. In response to the received content being the video link address of the video, the video reproducing device 20-1 may acquire a video indicated by the video link address by accessing the server and reproduce the acquired video.

The video reproducing device 20-1 may display the received content representative information through the display 130. For example, in response to the video being reproduced, the video reproducing device 20-1 may display at least one of the title, captions, characters, thumbnail, scenario, or the producer of the video through the display 130.

Figure 6B:
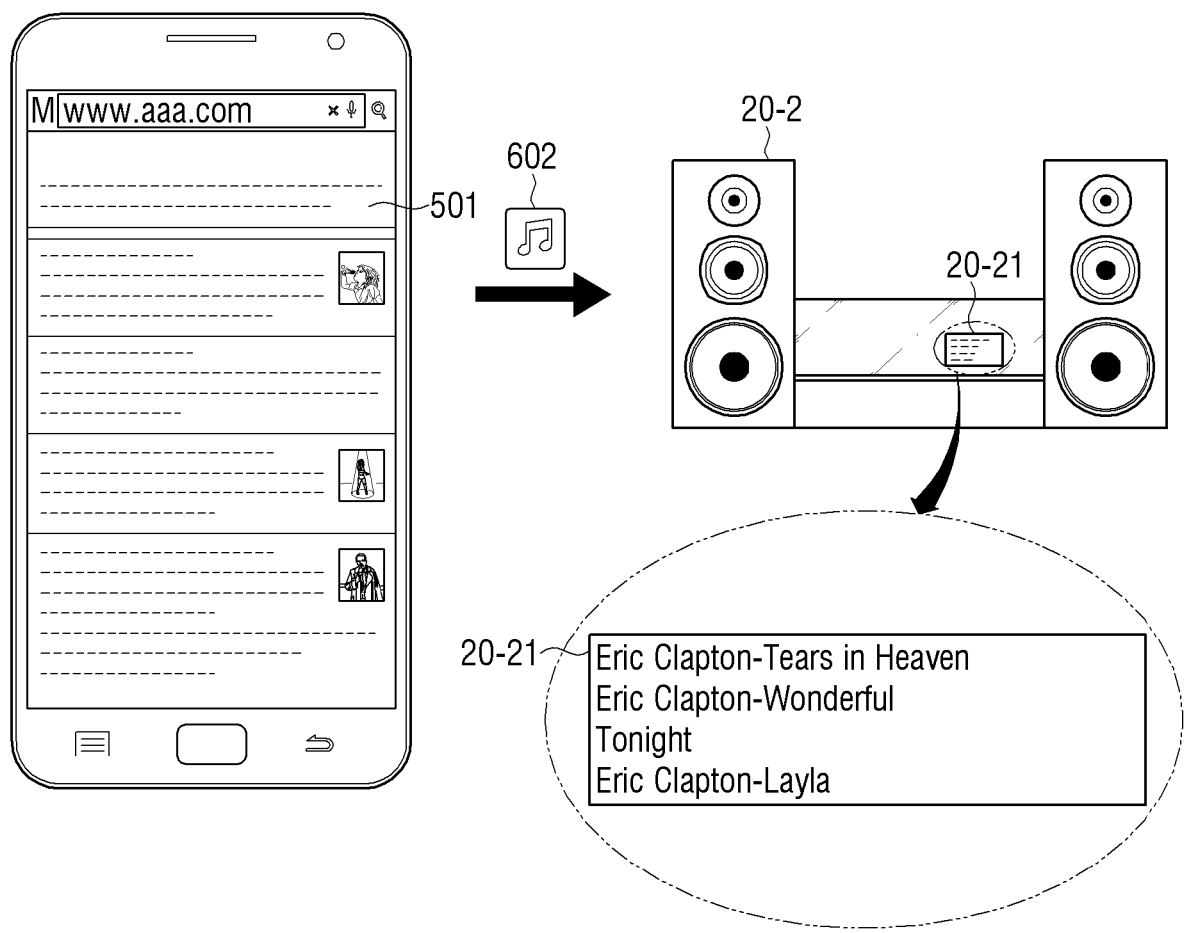

According to another embodiment, in (c) of FIG. 5, the user may select the external device identification information 503-2 corresponding to an audio reproducing device 20-2 (e.g., stereo system) that is capable of reproducing the audio as the external device 20. In this case, as illustrated in FIG. 6B, the processor 190 may determine the content executable in the audio reproducing device 20-2 from among the plurality of pieces of content of the electronic document 501 based on the type of the plurality of pieces of content and the function information on the audio reproducing device 20-2. By way of example, in response to the function information on the audio reproducing device 20-2 indicating the audio reproducing function, the processor 190 may determine at least one piece of content in an audio type from among the plurality of pieces of content of the electronic document 501. Specifically, in response to the electronic document 501 being a web document searched by a keyword, the song title "Tears in Heaven," the processor 190 may determine the audio included in the web document or an audio link address of the audio as the content executable in the audio reproducing device 20-2. The audio or the audio link address may be the background music that is reproduced when the electronic document 501 is displayed, for example.

The processor 190 may determine the content executable in the audio reproducing device 20-2 from among a plurality of pieces of content included in other electronic document related to the electronic document 501. For example, the processor 190 may extract a keyword from the electronic document 501 and determine at least one piece of content in an audio type form among the plurality of pieces of content of the other electronic document as the content executable in the audio reproducing device 20-2 by using the extracted keyword. Specifically, in response to the electronic document 501 being a web document searched by a keyword, the song title "Tears in Heaven," the processor 190 may extract a keyword "Eric Clapton," the singer of the song "Tears in Heaven" from the searched web document. Further, the processor 190 may receive another electronic document searched by the keyword "Eric Clapton" through the communicator 140. The processor 190 may determine additional contents executable in the audio reproducing device 20-2 from among the plurality of contents of the received electronic document. To be specific, the processor 190 may determine the songs "Wonderful Tonight" and "Layla" sung by "Eric Clapton" as the contents executable in the audio reproducing device 20-2.

In response to at least one content executable in the audio reproducing device 20-2 being determined from among the contents of at least one of the electronic document 501 and other electronic document, the processor 190 may control the communicator 140 to transmit information 602 including the audio included in the electronic document 501 or the audio link address of the audio to the audio reproducing device 20-2.

In response to the processor 190 determining at least one piece of content executable in the audio reproducing device 20-2, the processor 190 may control the display 130 to display a content list including at least one piece of content representative information corresponding to the at least one determined piece of content. In this case, the processor 190 may control the communicator 140 to transmit information 602 including the audio corresponding to the content representative information selected by the user from the content list or the audio link address of the audio to the audio reproducing device 20-2.

Further, the processor 190 may generate a content list including the content representative information corresponding to the at least one determined piece of content. For example, in response to the content being the audio or the audio link address, the content representative information may be a title, lyrics, a thumbnail, a songwriter, or a singer of the audio, for example. The content representative information may be extracted from the electronic document 501 or other electronic document related to the electronic document 501.

In response to the content list being generated, the processor 190 may control the communicator 140 to transmit the generated content list to the audio reproducing device 20-2.

The audio reproducing device 20-2 may receive at least one of the content and the content representative information and reproduce the content based on the received content. For example, in response to the received content being the audio, the audio reproducing device 20-2 may directly reproduce the audio. In response to the received content being the audio link address, the audio reproducing device 20-2 may acquire the audio indicated by the audio link address by accessing the server and reproduce the acquired audio.

When the audio reproducing device 20-2 includes a display 20-21, the audio reproducing device 20-2 may display the received content representative information through the display 20-21. For example, when reproducing the audio, the audio reproducing device 20-2 may display at least one of the title, lyrics, thumbnail, songwriter, or singer of the audio through the display 20-21.

According to another embodiment, in (c) of FIG. 5, the user may select the external device identification information 503-3 corresponding to a text display device 20-3 (e.g., tablet PC or e-book reader) that is capable of displaying text as the external device 20.

Figure 6C:
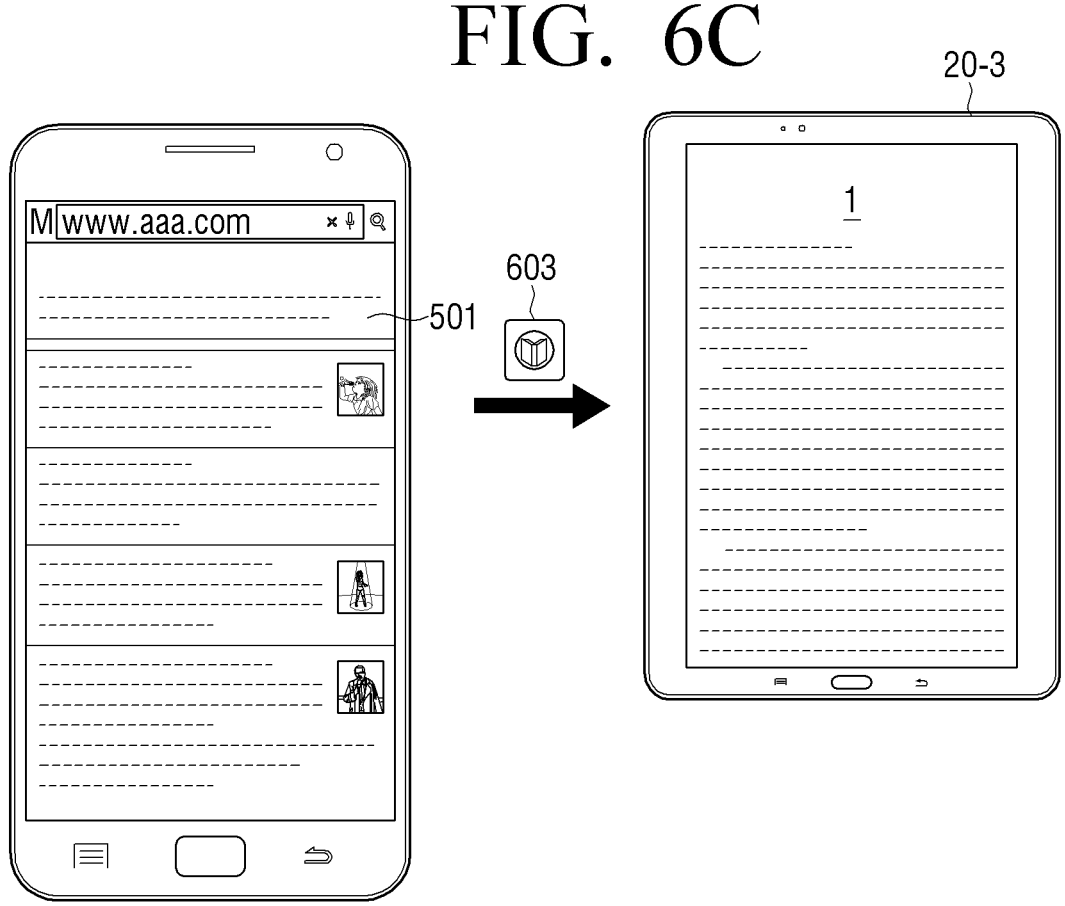

In this case, as illustrated in FIG. 6C, the processor 190 may determine content executable in the text display device 20-3 from among the plurality of pieces of content included in the electronic document 501 based on the type of the plurality of pieces of content and the function information on the text display device 20-3. For example, in response to the function information on the text display device 20-3 indicating the text display function, the processor 190 may determine at least one piece of content in a text type from among the plurality of pieces of content of the electronic document 501. Specifically, in response to the electronic document 501 being a web document searched by a keyword "Tears in Heaven," the processor 190 may determine the text included in the web document or the text link address of the text as the content executable in the text display device 20-3.

Further, the processor 190 may determine the content executable in the text display device 20-3 from among a plurality of pieces of content included in other electronic document related to the electronic document 501. For example, the processor 190 may extract a keyword from the electronic document 501 and determine at least one content in the text type from among the plurality of contents of the searched electronic document as the content executable in the text display device 20-3 by using the extracted keyword.

In response to the at least one content executable in the text display device 20-3 being determined from the contents of at least one of the electronic document 501 and the other electronic document, as illustrated in FIG. 6C, the processor 190 may control the communicator 140 to transmit information 603 including the text of the electronic document 501 or the text link address to the text display device 20-3.

In response to the processor 190 determining at least one piece of content executable in the text display device 20-3, the processor 190 may display the display 130 to display a content list including at least one piece of content representative information corresponding to the at least one determined content. In this case, the processor 190 may control the communicator 140 to transmit the information 603 including the text corresponding to the content representative information selected by the user from the content list or the text link address to the text display device 20-3.

In response to the processor 190 transmitting the information on the content to the text display device 20-3 through the communicator 140, the processor 190 may render and transmit the text of the electronic document 501 such that user readability of the text may be enhanced. For example, the processor 190 may render at least one of a size, spaces between letters, a color, a font of the text to be suitable for the screen of the text display device 20-3, and transmit the rendered text to the text display device 20-3.

Further, the processor 190 may generate the content list including the content representative information corresponding to the at least one determined content. For example, in response to the content being the text or the text link address of the text, the content representative information may be a title, a writer, a source, a creation data, or a thumbnail of the text. The content representative information may be extracted from the electronic document 501 or other electronic document related to the electronic document 501.

In response to the content list being generated, the processor 190 may control the communicator 140 to transmit the generated content list to the text display device 20-3.

The text display device 20-3 may receive at least one of the text and the content representative information and display the text based on the received text. For example, in response to the received content being the text, the text display device 20-3 may display the text in the screen. In response to the received content being the text link address, the text display device 20-3 may acquire the text indicated by the text link address by accessing the server and display the acquired text in the screen.

The text display device 20-3 may display the received content representative information through the display. For example, in response to displaying the text, the text display device 20-3 may display at least one of the title, writer, and creation date of the text through the display.

Figure 7:
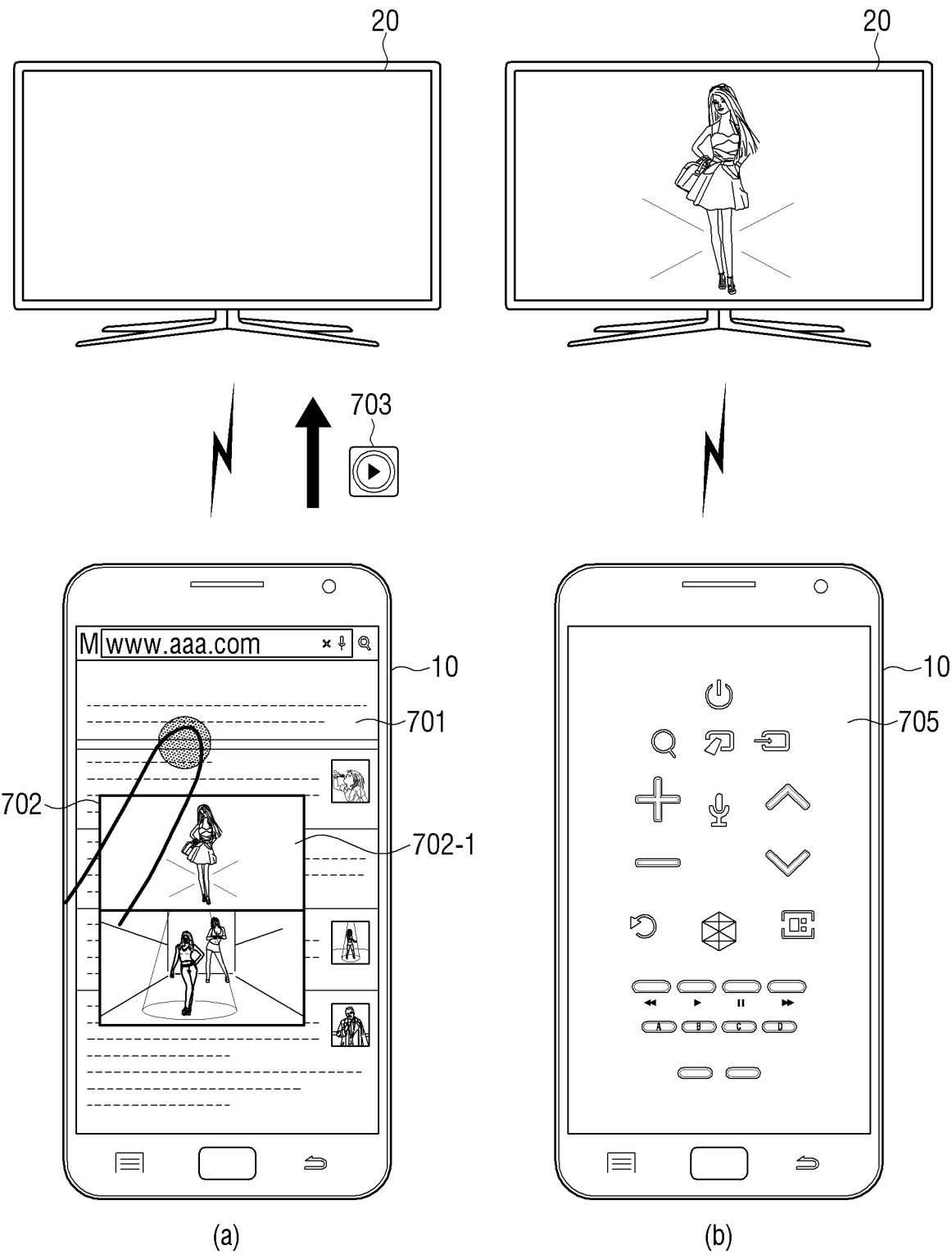

FIG. 7 is a diagram illustrating an electronic device sharing content, according to another embodiment of the present disclosure.

Referring to (a) of FIG. 7, the processor 190 controls the communicator 140 to receive an electronic document 701 (e.g., web document) including a plurality of contents from the server. Further, the processor 190 controls the display 130 to display the electronic document 701 by parsing the received electronic document 701.

The processor 190 may determine at least one piece of content executable in the external device 20 from among the plurality of pieces of content of the electronic document 701 based on the type of the plurality of pieces of content and the function information on the external device 20.

In response to determining at least one piece of content executable in the external device 20 from among the plurality of pieces of content, the processor 190 controls the display 130 to display a content list 702 including at least one piece of content representative information corresponding to the at least one determined piece of content. Subsequently, the sensor 180 senses a user input selecting content representative information 702-1 from the content list 702.

In response to the content representative information 702-1 being selected, the processor 190 controls the communicator 140 to transmit information 703 on the content corresponding to the selected content representative information 701-2 to the external device 20.

In response to the information 703 on the content being transmitted to the external device 20, as illustrated in (b) of FIG. 7, the external device 20 reproduces the content based on the received content.

The processor 190 of the electronic device 10 controls the display 130 to display a UI 705 for controlling the content being reproduced in the external device 20.

As an example, in response to the content reproduced in the external device 20 being a video, the processor 190 may control the display 130 to display the UI 705 including video control function items, such as, pausing, starting reproduction, stopping reproduction, speed control, caption size control, caption location control of the video, or the like.

As another example, in response to the content reproduced in the external device 20 being audio, the processor 190 may control the display 130 to display a UI including audio control functions items, such as, pausing, starting reproduction, stopping reproduction, speed control, interval repetition, equalizer control of the audio, or the like.

As still another example, in response to the content reproduced in the external device 20 being text, the processor 190 may control the display 130 to display a UI including text control functions items, such as, starting display, stopping display, automatic scrolling, page turning, size control, line-spacing control, font control of the text, or the like.

In response to information including the plurality of contents being transmitted to the external device 20, the processor 190 of the electronic device 10 may control the display 130 to display a UI for converting the respective plurality of contents, moving to the respective plurality of contents, or searching for the respective plurality of contents.

Figure 8:
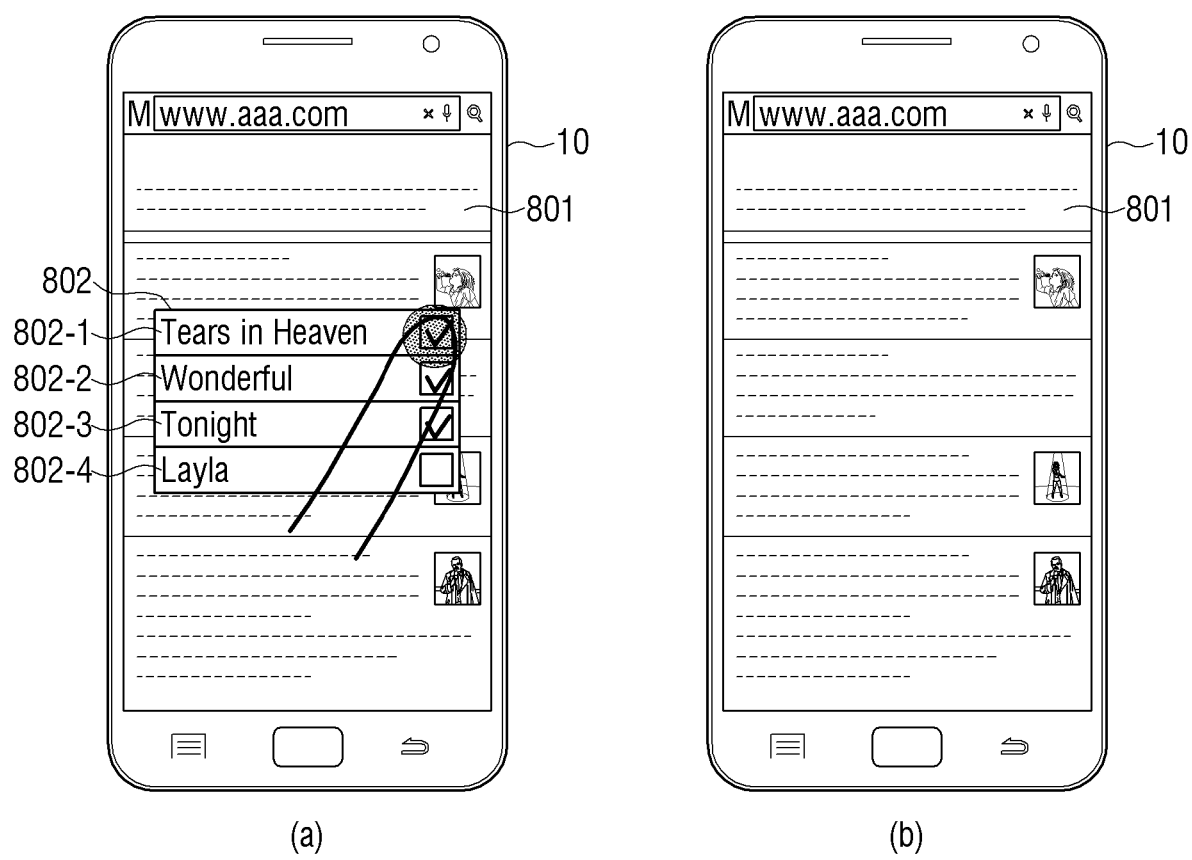

FIG. 8 is a diagram illustrating an electronic device sharing content, according to still another embodiment of the present disclosure.

Referring to (a) of FIG. 8, the processor 190 controls the communicator 140 to receive an electronic document 801 (e.g., web document) including a plurality of pieces of content from the server. Further, the processor 190 controls the display 130 to display the electronic document 801 by parsing the received electronic document 801.

The processor 190 determines a plurality of pieces of content executable in the external device 20 from among the plurality of pieces of content of the electronic document 801 based on the type of the plurality of pieces of content and the function information on the external device 20.

In response to the plurality of pieces of content executable in the external device 20 being determined, the processor 190 displays a content list 802 including a plurality of pieces of content representative information 802-1, 802-2, 802-3, 802-4 corresponding to the plurality of determined pieces of content. Subsequently, the sensor 180 senses a user input selecting the plurality of pieces of content representative information 802-1, 802-2, 802-3 from the content list 802. For example, in response to content list 802 including a plurality of check boxes corresponding to each of the plurality of pieces of content representative information 802-1, 802-2, 802-3, 802-4, the sensor 180 may sense a user input of selecting the plurality of pieces of content representative information 802-1, 802-2, 802-3 through the plurality of check boxes.

In response to the plurality of pieces of content representative information 802-1, 802-2, 802-3 being selected, the processor 190 controls the communicator 140 to transmit information 803 including the plurality of pieces of content corresponding to the plurality of pieces of content representative information 802-1, 802-2, 802-3 to the external device 20.

In response to the information 803 including the plurality of pieces of content being transmitted to the external device 20, as illustrated in (b) of FIG. 8, the external device 20 may reproduce the plurality of pieces of content sequentially or randomly based on the plurality of received pieces of content.

Figure 9:
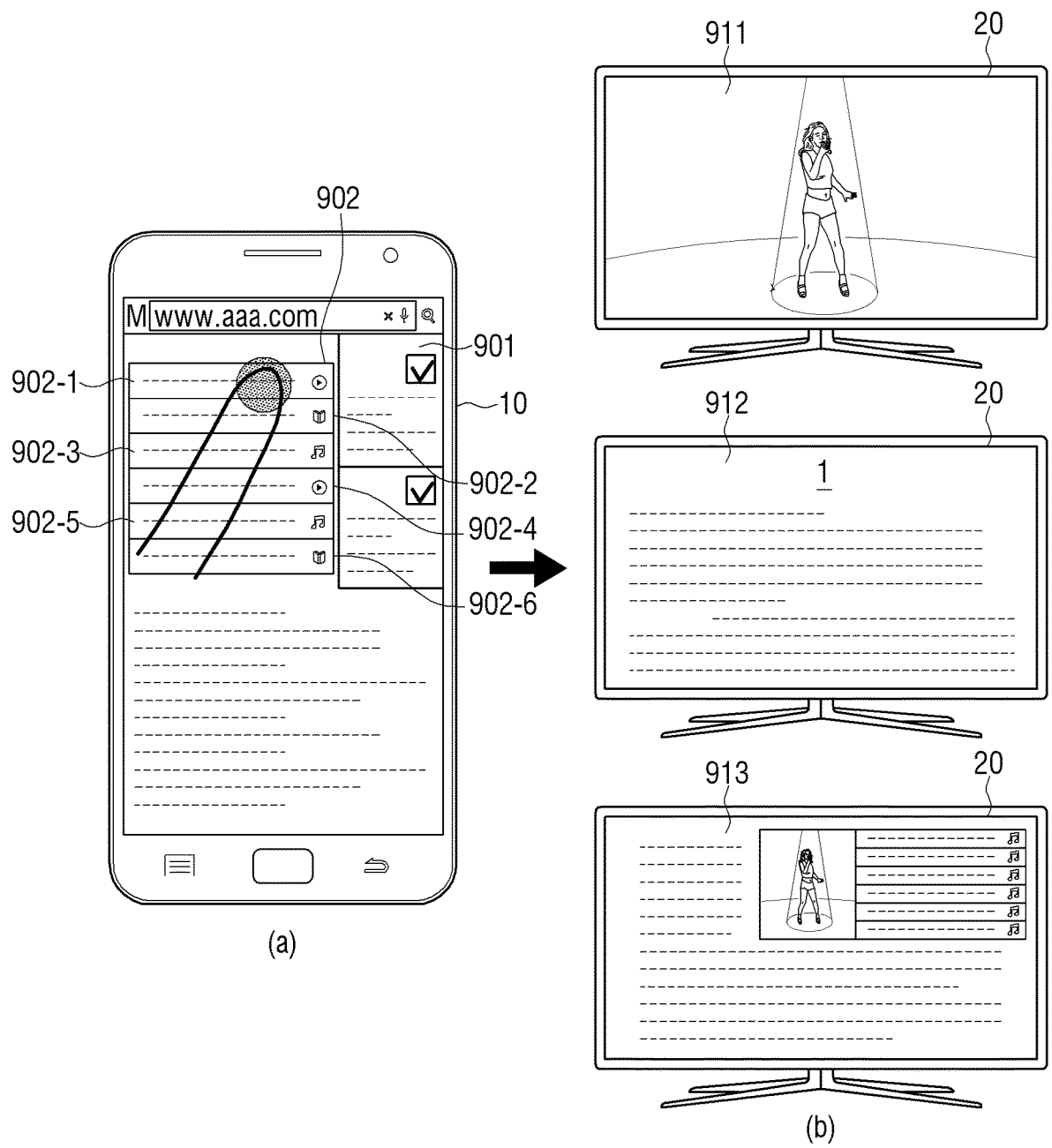

FIG. 9 is a diagram illustrating an electronic device sharing content, according to another embodiment of the present disclosure.

Referring to (a) of FIG. 9, the processor 190 controls the communicator 140 to receive an electronic document 901 (e.g., web document) including a plurality of pieces of content from the server. Further, the processor 190 controls the display 130 to display the electronic document 901 by parsing the received electronic document 901.

The processor 190 determines a plurality of pieces of content executable in the external device 20 from among the plurality of pieces of content of the electronic document 901 based on the type of the plurality of pieces of content and the function information on the external device 20.

In this case, a plurality of pieces of function information on the external device 20 may be provided. For example, in response to the external device 20 being realized as a TV, the function information on the external device 20 may indicate the video reproducing function, the audio reproducing function, and the text display function.

In response to the plurality of pieces of content executable in the external device 20 being determined, the processor 190 controls the display 130 to display a content list 902 including a plurality of pieces of content representative information 902-1, 902-2, 902-3, 902-4, 902-5, 902-6 corresponding to each of the plurality of determined pieces of content. In this case, at least two or more pieces of content among the plurality of pieces of content may have different types. By way of example, some of the plurality of pieces of content may be a video type, some of the plurality of pieces of content may be an audio type, and some of the plurality of pieces of content may be a text type.

Subsequently, the sensor 180 senses a user input of selecting at least one piece of content representative information from the content list 902.

In response to at least one piece of content representative information being selected, the processor 190 controls the communicator 140 to transmit information on the content corresponding to the selected content representative information to the external device 20.

In response to the information on the content being transmitted to the external device 20, as illustrated (b) of FIG. 9, the external device 20 reproduces the content based on the received content.

In this case, the external device 20 may change a content reproducing screen depending upon a type of the received contents.

Specifically, the external device 20 may provide a plurality of screen modes according to the type of the content. For example, in response to the type of the content being a video, the external device 20 operates in a video mode. In response to the external device 20 operating in the video mode, a color temperature of the screen may be at least one of 6500K and 5500K, for example.

In response to the type of the content being text, the external device 20 operates in a text mode. In response to the external device 20 operating in the text mode, the color temperature of the screen may be at least one of 4000K and 5000K, for example.

In response to the type of the content being audio, the external device 20 operates in an audio mode. Meanwhile, the external device 20 may provide a plurality of sub modes in one screen mode. For example, in response to the external device 20 operating in the video mode, the video mode may include a standard screen mode, a sports screen mode, a movie screen mode, or the like.

According to an embodiment, in response to the type of the received contents being the video, the external device 20 may determine a current screen mode. In response to the current screen mode being the video mode, the external device 20 may maintain the current screen mode. By contrast, in response to the current screen mode not being the video mode, the external device 20 may convert the current screen mode to the video mode. Accordingly, as illustrated by reference numeral 911 of FIG. 9, the external device 20 may adjust at least one of the color, visibility, and color temperature of the screen to be suitable for the reproduction of the video and reproduce the video.

In response to the type of the received contents being the text, the external device 20 may determine the current screen mode. In response to the current screen mode being the text mode, the external device 20 may maintain the current screen mode. By contrast, in response to the current screen mode not being the text mode, the external device 20 may convert the current screen mode to the text mode. Accordingly, as illustrated by reference numeral 912 of FIG. 9, the external device 20 may adjust at least one of the color, visibility, and color temperature of the screen to be suitable for the display of the text and display the text. In this case, the external device 20 may render and display the text to be suitable for the screen. As an example, the external device 20 may render at least one of the size, spaces between letters, color, font of the text to be suitable for the screen and display the rendered text in the screen. As another example, in response to the text being rendered to be suitable for the screen by the electronic device 10 and transmitted to the external device 20, the external device 20 may display the rendered text in the screen.

According to still another embodiment, in response to the type of the received contents being the audio, the external device 20 may determine the current screen mode. In response to the current screen mode being the audio mode, the external device 20 may maintain the current screen mode. By contrast, in response to the current screen mode not being the audio mode, the external device 20 may convert the current screen mode to the audio mode. Accordingly, as illustrated by reference numeral 913 of FIG. 9, the external device 20 may adjust at least one of the color, visibility, and color temperature of the screen to be suitable for the display of a thumbnail of the audio or the text related to the audio (e.g., the lyrics, writer, or singer of the audio). Further, the external device 20 may render the thumbnail of the audio or the text related to the audio to be suitable for the screen and display the rendered thumbnail or text in the screen. As another example, in response to the thumbnail or text being rendered to be suitable for the external device 20 by the electronic device 10 and transmitted to the external device 20, the external device 20 may display the rendered thumbnail or text in the screen.

Figure 10:
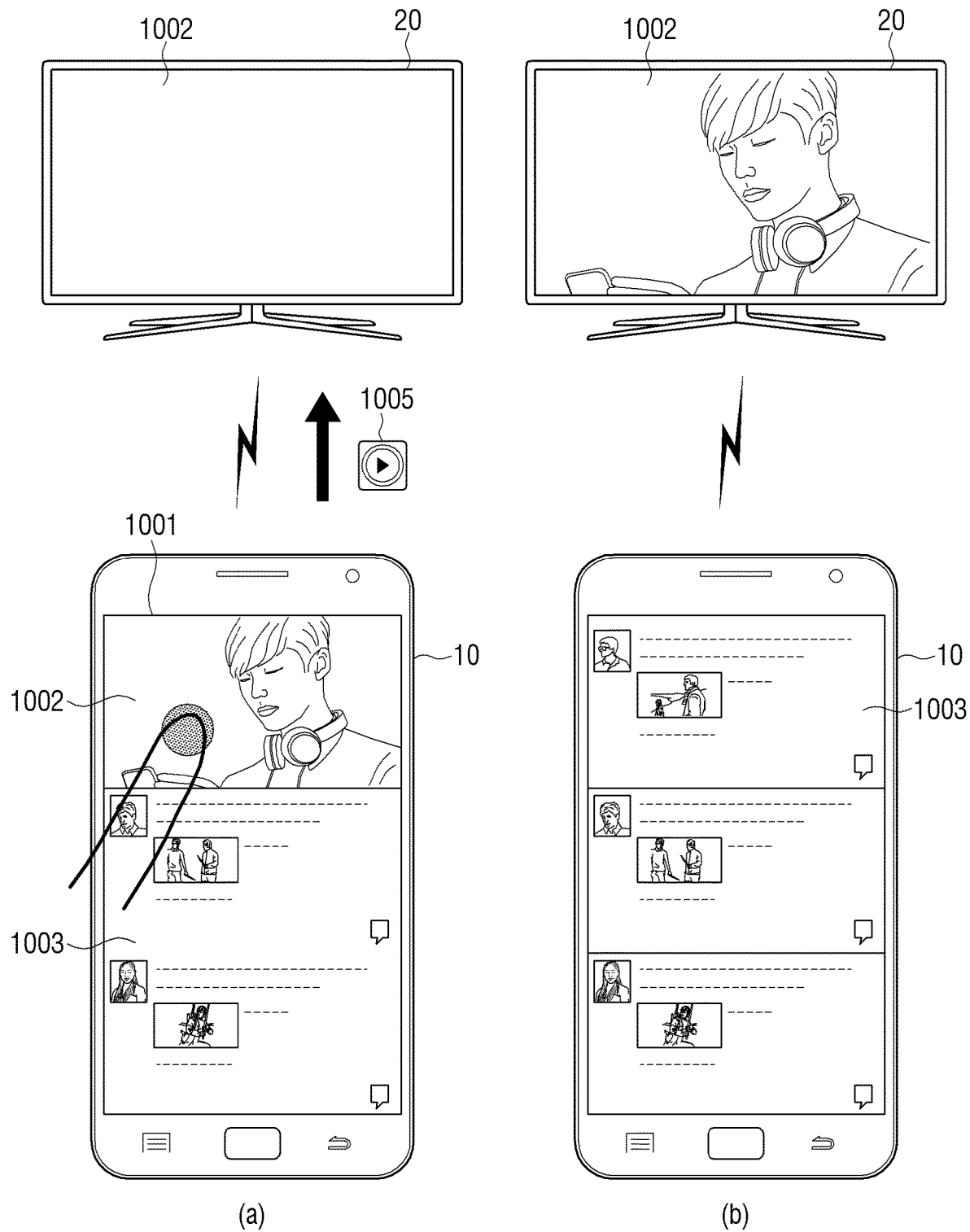

FIG. 10 is a diagram illustrating an electronic device sharing content, according to another embodiment of the present disclosure.

Referring to (a) of FIG. 10, the processor 190 controls the communicator 140 to receive an electronic document 1001 (e.g., web document) from the server (e.g., social network service (SNS) server). Subsequently, the processor 190 controls the display 130 to display the electronic document 1001 by parsing the received electronic document 1001. The electronic document 1001 may include content 1002 (e.g., a video registered by a third party or a real-time broadcasting video) and specific information 1003 on the content 1002 (e.g., comments on the content, contents of the content, grades of the content, a virtual keypad for inputting comments on the content, a chat window regarding the content, or the like).

In this case, the sensor 180 senses a user input of selecting the content 1002.

In response to the user input, the processor 190 determines the external device 20 capable of reproducing the selected content 1002 from among a plurality of external devices connected to the electronic device 10 based on the type of the selected content 1002 and the function information on the external device 20.

In response to the determination of the external device 20, the processor 190 controls the communicator 140 to transmit information 1005 including a link address of the selected content 1002 to the external device 20.

In response to the transmission of the information 1005, as illustrated in (b) of FIG. 10, the external device 20 reproduces the content based on the link address of the received content 1002. When the content 1002 is a real-time broadcasting video, the external device 20 may receive the video in real time from a server indicated by the link address of the video and display the video in the screen.

Further, the external device 20 may receive the content in real time from the electronic device 10 and display the video in the screen. By way of example, the external device 20 may receive the content in real time from the electronic device 10 by means of a mirroring method or a streaming method, and may display the video in the screen.

As illustrated in the drawing of the electronic device 10 in (b) of FIG. 10, the processor 190 controls the display 130 to continue to display the specific information 1003 on the content 1002 in the screen. By way of example, the processor 190 may control the display 130 to continue to display the specific information 1003 excluding the video in the screen while reproducing the video in the external device 20. In this case, more specific information may be displayed in the screen since the video is excluded from the screen. For example, a greater amount of comments may be displayed in the screen.

As described above, the video is displayed in a large screen of the external device 20, and the specific information on the video or a screen for receiving a user input is displayed separately in the screen of the electronic device 10 held by the user. Consequently, the convenience of the user using both the electronic device 10 and the external device 20 may be enhanced.

Figure 11:
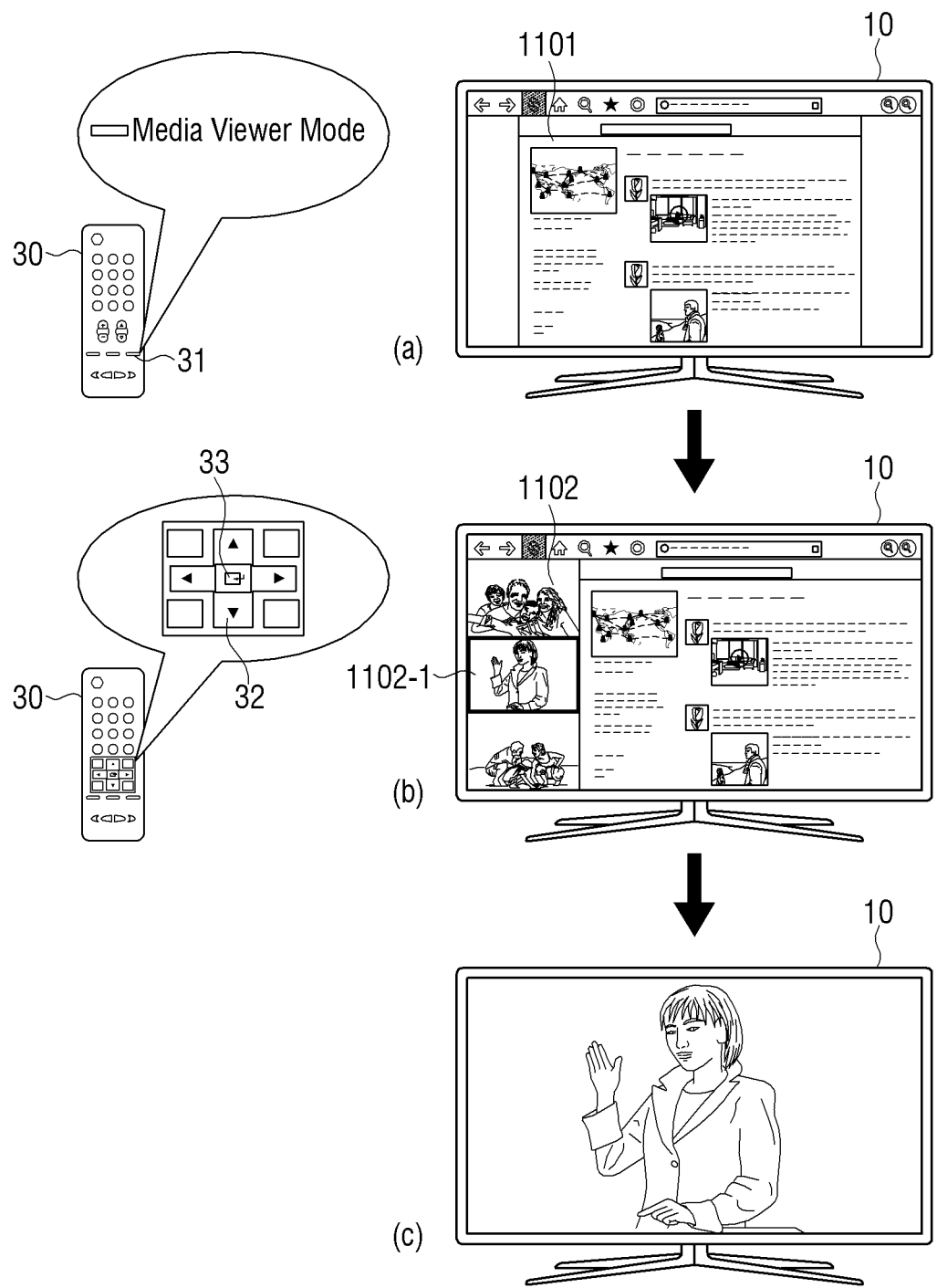

FIG. 11 is a diagram illustrating an electronic device providing content, according to another embodiment of the present disclosure.

Referring to (a) of FIG. 11, the processor 190 controls the communicator 140 to receive an electronic document 1101 (e.g., web document) including a plurality of contents from the server. Further, the processor 190 controls the display 130 to display the electronic document 1101 by parsing the received electronic document 1101.

In this case, the sensor 180 senses a user input for extracting the plurality of contents from the web document. The user input may be a content-display mode select signal that the sensor 180 receives from a remote controller 30 in response to a user request of selecting a content-display mode button 31 on the remote controller 30, for example.

In response to the user input, the processor 190 extracts the plurality of pieces of content included in the electronic document 1101. Further, the processor 190 determines at least one piece of content executable in the electronic device 10 from among the plurality of extracted pieces of content based on the type of the extracted pieces of content and the function information on the electronic device 10. By way of example, in response to the electronic device 10 being realized as a video reproducing device, the processor 190 may determine at least one piece of content in the video type.

Subsequently, as illustrated in (b) of FIG. 11, the processor 190 controls the display 130 to display a content list 1102 including a plurality of pieces of content representative information corresponding to at least one determined piece of content. The content list 1102 may be displayed on a certain side in the screen of the electronic device 10 in a form of a list. Further, the content list 1102 may be displayed in the screen of the electronic device 10 in a form of a pop-up window. Further, the content list 1102 may be displayed in a form of a line along at least one axis of the screen of the electronic device 10.

In response to the content list 1102 being displayed, the sensor 180 senses a user input of moving to one piece of content representative information 1102-1 among the plurality of pieces of content representative information included in the content list 1102. The user input may be a one-direction button select signal that the sensor 180 receives from the remote controller 30 in response to the user input of selecting a button 32 from among four-direction buttons of the remote controller, for example.

In response to the user input, the processor 190 moves a cursor or a highlight to a location of the content representative information 1102-1 corresponding to the one-direction button select signal, in the content list 1102. Subsequently, the sensor 180 senses the user input of selecting the content representative information 1102-1. The user input may be an execute-button select signal that the sensor 180 receives from the remote controller 30 in response to the user selecting an execute button 33, for example.

In response to the user input, as illustrated in (c) of FIG. 10, the processor 190 displays an execution screen of the selected content. For example, in response to the selected content being the video, the processor 190 may control the display 130 to display the video reproducing screen.

Figure 12:
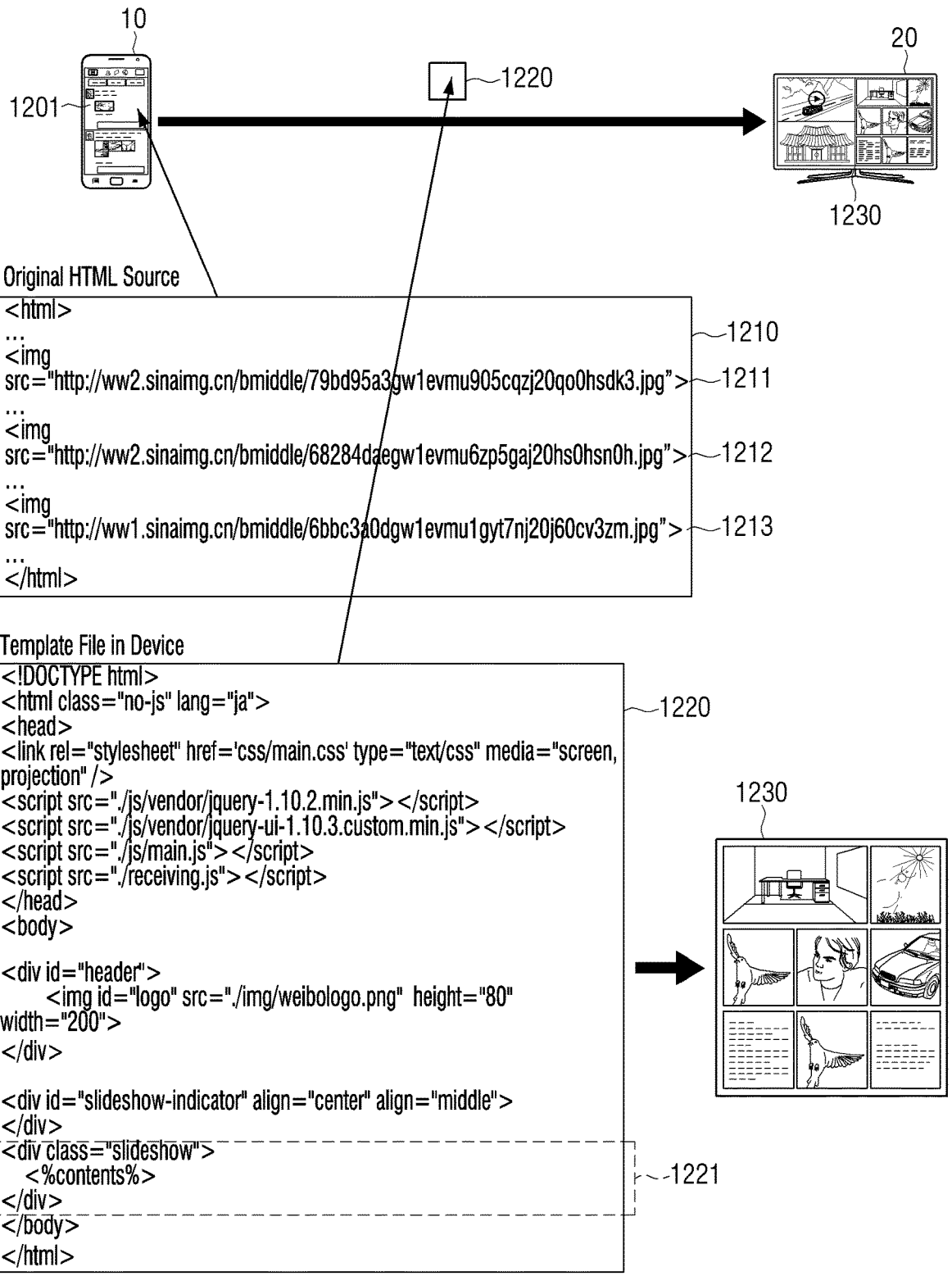

FIG. 12 is a diagram illustrating an electronic device 10 providing content, according to another embodiment of the present disclosure.

Referring to FIG. 12, the processor 190 controls the communicator 140 to receive an electronic document 1201 (e.g., web document) including a plurality of pieces of content from the server. Reference number 1210 of FIG. 12 illustrates a source code of the received electronic document 1201.

In response to a user input for transmitting the content to the external device 20, the processor 190 determines a plurality of pieces of content executable in the external device 20 from among the plurality of pieces of content of the electronic document 1201 based on the type of the plurality of pieces of content and the function information on the external device 20. As an example, in response to the function information on the external device 20 indicating the video reproducing function and the image display function, the processor 190 may determine a plurality of pieces of content of the video type and the image type. As another example, as illustrated by reference number 1210 of FIG. 12, the processor 190 determines a plurality of image link addresses 1211, 1212, 1213 as the pieces of content executable in the external device 20.

According to an embodiment, in response to the determination of the pieces of content, the processor 190 generates a template file 1220 including a plurality of pieces of content. By way of example, a "slide show" class syntax 1221 of the template file includes the plurality of image link addresses 1211, 1212, 1213. The template file may be realized as languages, such as, hypertext markup language (HTML), extensible markup language (XML), extensible hypertext markup language (XHTML), or the like. In response to the template file being parsed, a content page 1230 is generated. The content page 1230 may include images indicated by the image link addresses.

Subsequently, the processor 190 controls the communicator 140 to transmit the template file 1220 including the contents to the external device 20.

The external device 20 receives the template file 1220, parses the received template file 1220, and displays the content page 1230 in the screen. In this case, the external device 20 may display the content page 1230 in the entire area of the screen or in a part or area of the screen (e.g., certain side of the screen). Subsequently, in response to a user input of selecting one piece of content representative information from the content page 1230, the external device 20 may display the execution screen of the contents corresponding to the selected content representative information through the display.

Figure 13:
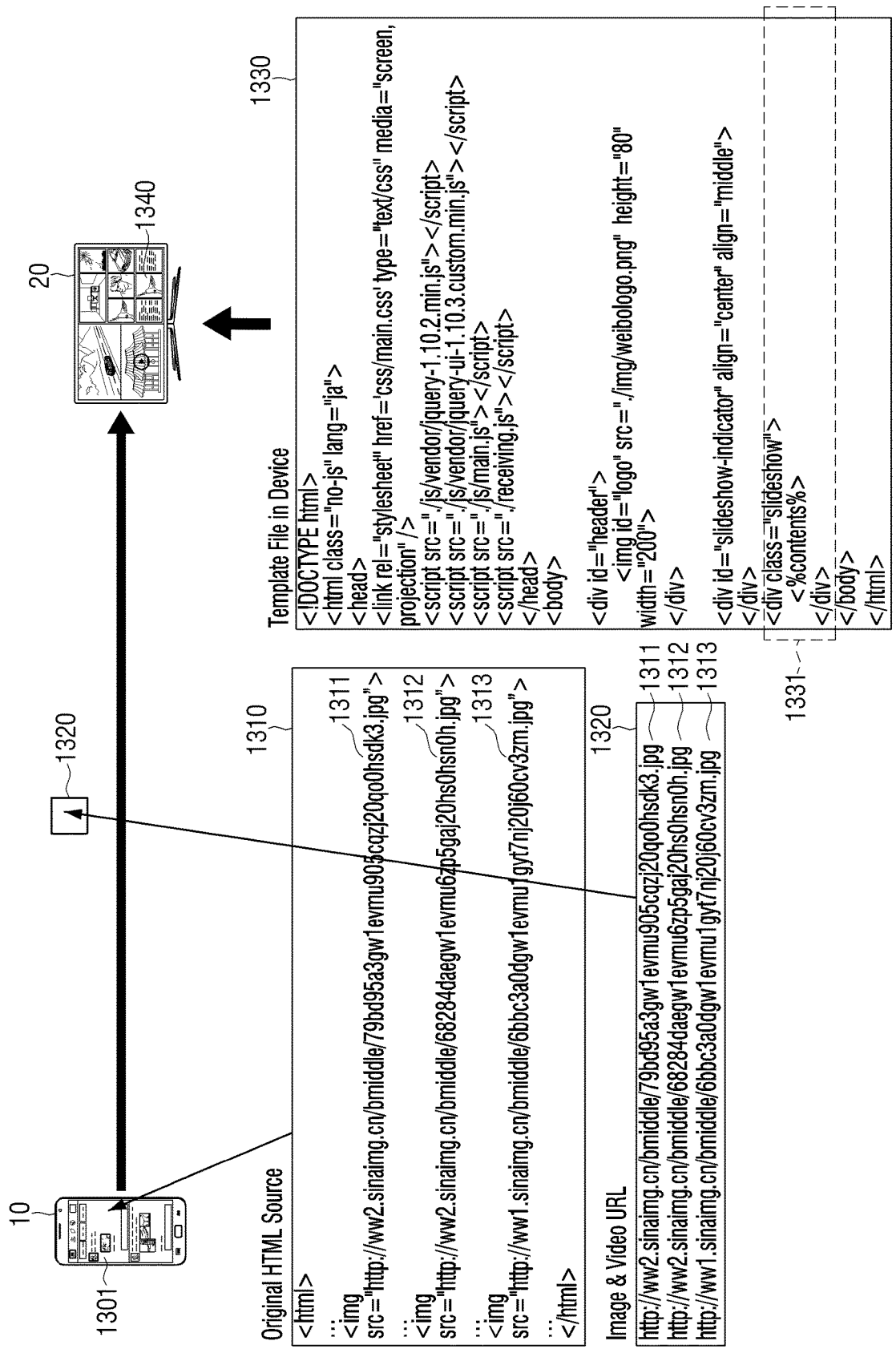

FIG. 13 is a diagram illustrating an electronic device providing content, according to another embodiment of the present disclosure.

Referring to FIG. 13, the processor 190 controls the communicator 140 to receive an electronic document 1301 (e.g., web document) including a plurality of pieces of content from the server. Further, the processor 190 controls the display 130 to display the electronic document 1301 by parsing the received electronic document 1301. Reference number 1310 of FIG. 13 illustrates a source code of the received electronic document 1301.

In response to a user input for transmitting the content to the external device 20, the processor 190 determines a plurality of pieces of content executable in the external device 20 from among the plurality of pieces of content of the electronic document 1301 based on the type of the plurality of pieces of content and the function information on the external device 20. As an example, as illustrated by reference number 1310 of FIG. 13, the processor 190 determines a plurality of image link addresses 1311, 1312, 1313 as the pieces of content executable in the external device 20.

According to an embodiment, in response to the determination of the pieces of content, the processor 190 controls the communicator 140 to transmit data 1320 including the plurality of pieces of content to the external device 20.

The external device 20 receives the data 1320 including the plurality of pieces of content and generates generate a template file 1330 including a plurality of pieces of content by using the received data 1320. For example, a "slide show" class syntax 1331 of the template file 1330 includes the plurality of image link addresses 1311, 1312, 1313. Subsequently, the external device 20 generates a content page 1340 including images indicated by the image link addresses by parsing the template file. Subsequently, the external device 20 displays the generated content page 1340 in the screen. In this case, the external device 20 may display the content page in the entire area of the screen or in a part or area of the screen (e.g., certain side of the screen). In response to a user input of selecting one piece of content representative information from the content page 1340, the external device 20 may display the execution screen of the content corresponding to the selected content representative information through the display.

Figure 14:
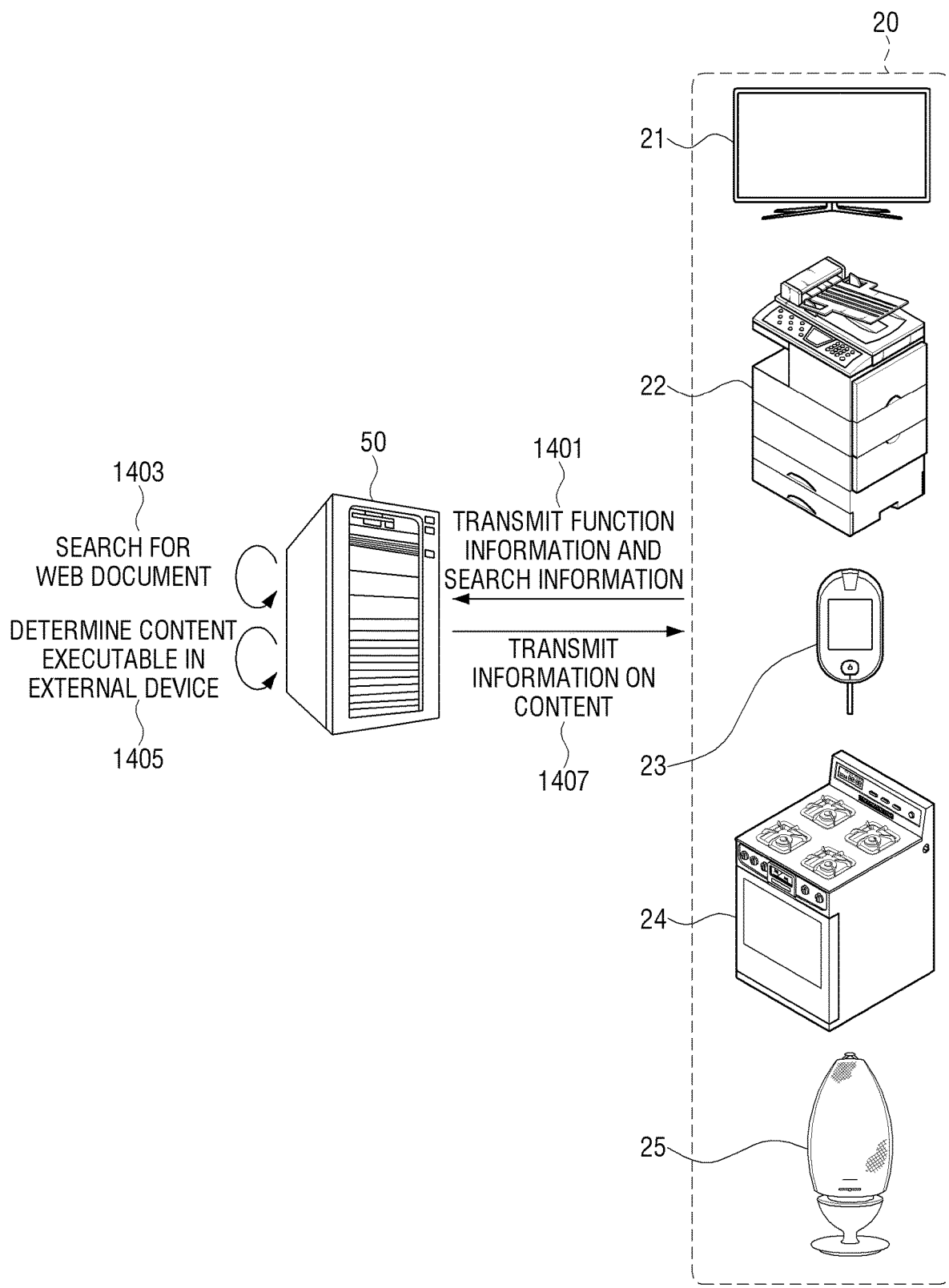
FIG. 14 is a diagram illustrating an electronic device sharing content with external devices, according to another embodiment of the present disclosure.

FIG. 14 is a diagram illustrating a server sharing content with an external device, according to another embodiment of the present disclosure.

Referring to FIG. 14, a server 50 transmits information on contents included in an electronic document (e.g., web document) stored in the server 50 based on the function information from the external device 20 and the search information received.

The server 50 may be a device that stores or provides the web document. The server 50 may be realized as one or more servers. By way of example, the server 50 may collect information by operating in conjunction with a plurality of servers as a cloud server and provide the collected information in a form of a web document.

The external device 20 may be a device that may access the server 50. In FIG. 1, the external device 20 may include the above-described video reproducing device, audio reproducing device, text display device, and other diverse types of devices. For example, the external device 20 may include at least one of various sensors (e.g., motion sensor, window opening/closing sensor, smoke sensor, power output sensor, or the like), a gas meter, a sprinkler, a fire alarm, a temperature control system (thermostat), a streetlamp, sporting goods, a hot-water tank, a heater, a home appliance (e.g., a TV, a refrigerator, an oven, a washing machine, a dryer, or the like), a smart lamp, an electric meter, a gas meter, a solar power system, a sprinkler system, a temperature control system (thermostat), a vehicle, a wearable device, a closed circuit television (CCTV), writing articles, a keyboard, a mouse, a charger, furniture (e.g., a bed, a mirror, or the like), a door-lock, and a security system, as an Internet of Things (IoT) device.

Further, the external device 20 may include at least one of diverse medical devices (e.g., various kinds of portable medical measuring devices (blood glucose measuring devices, heart rate monitors, blood pressure measuring devices, thermometers, or the like), a magnetic resonance angiography (MRA) unit, a magnetic resonance imaging (MRI) unit, a computed tomography (CT) unit, a ultrasound unit, or the like), navigation, a global navigation satellite system (GNSS), an event data recorder (EDR), a flight data recorder (FDR), an automotive infotainment device, marine electronic devices (e.g., a naval navigation system, a gyro compass, or the like), aviation electronics (avionics), security equipment, a printers, a head unit for vehicle, an industrial robot, a home robot, a drone, an ATM of banking facilities, and POS of shops.

Hereinafter, a detailed description on the external device 20 will be provided with reference to FIG. 14, by taking examples of a TV 21, a printer 22, a medical device 23 (e.g., blood glucose measuring device), a home appliance 24 (e.g., oven), and a wireless speaker 25.

In response to receiving a request for execution of a content included in a web document, the external device 20 transmits the function information on the external device 20 and the search information on the web document to the server 50, in step 1401.

The request for execution of a content may be an execution request that occurs according to a user input received through a UI provided by the external device 20 or the electronic device 10. Further, the request for execution of a content may be an execution request according to an event where power is on, an event where a predetermined time arrives, or a trigger event that occurs on a certain cycle.

The request for execution of a content may be an execution request which occurs as a quick response (QR) code or a barcode is scanned or a NFC tag or a radio frequency identification (RFID) tag is read in the external device 20.

The function information on the external device 20 may be information indicating a function executable in the external device 20 or a function that is mainly executed by the external device 20, as described above. The external device 20 may transmit identification information on the external device 20 instead of the function information on the external device 20. The identification information on the external device 20 may include at least one of a model name, a serial number, a type of device, information on a manufacturer, and information on a dealer of the external device 20.

The search information on the web document may be a keyword, an image, a voice, barcode information, or tag information necessary for searching for a web document stored in the server 50.

The server 50 that received the function information and the search information searches for the web document based on the received function information and search information, in step 1403.

In response to a plurality of web documents being searched, the server 50 may arrange the plurality of web document by priority and select a web document with the highest priority. In this case, the priority may be determined by creation data, the number of views, or the number of recommenders of a web document.

The server 50 determines at least one piece of content executable in the external device 20 from among the pieces of content included in the web document, in step 1405.

Subsequently, the server 50 transmits information on the searched content to the external device 20, in step 1407.

The information on the content may be a template file including link information on a content, a content list including content representative information, a content itself, or a processed content, for example.

The external device 20 executes the information on the content. For example, the external device 20 may reproduce or display the content or may be controlled by the content.

According to an embodiment, the external device 20 may be realized as the TV 21.

In this case, the TV 21 transmits a content display function to the server 50 as the function information on the TV 21.

Figure 15:
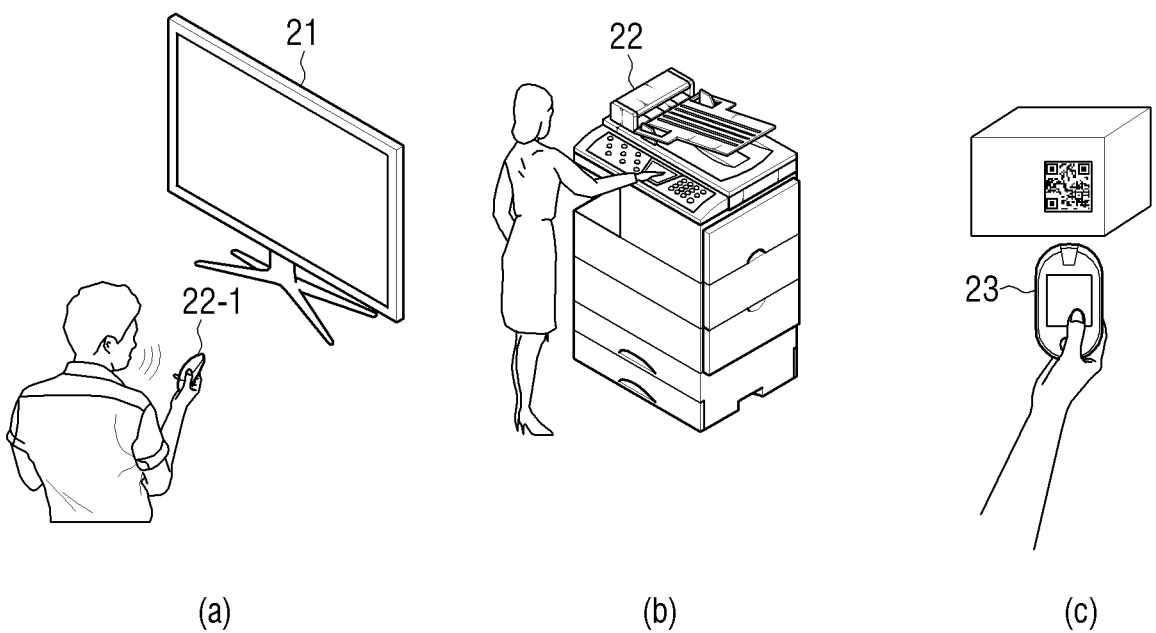
FIG. 15 is a diagram illustrating the generation of search information, according to an embodiment of the present disclosure.

Further, the TV 21 transmits the search information on the web document to the server 50. When a user speaks towards the TV 21 or towards the remote controller 22-1 communicating with the TV, as illustrated in (a) of FIG. 15, the search information may be voice information on the user's uttered voice acquired by the TV 21. In this case, the voice information may be the voice itself or information where the voice has been recognized and converted to the text.

The search information may be meta information on a video being reproduced in the TV 21. The meta information on the content may be at least one of a title, captions, characters, a synopsis, a production date, or a producer of the video, for example.

Further, the search information may be text information inputted by the user using the remote controller.

The server 50 that received the function information and the search information searches for the web document based on the received function information and search information.

Further, the server 50 determines at least one piece of content executable in the TV 21 from among the contents included in the searched web document.

Subsequently, the server 50 transmits information on the determined content to the TV 21. In this case, the information on the content may be information processed by the server 50. By way of example, in response to the content being the text, the information on the content may be a template file configured to enlarge the size of the text to be suitable for a large screen of the TV 21. To be specific, in response to the template file being made as a markup document, a font size value of the template file may increase.

The TV 21 executes the received information on the content. For example, the TV 21 may display the enlarged text in the screen.

According to another embodiment, the external device 20 may be realized as the printer 22.

In this case, the printer 22 transmits a print function to the server 50 as the function information on the printer 22.

Further, the printer 22 transmits the search information on the web document to the server 50. The search information may be a title of a printout being printed in the printer 22, for example. Further, the search information may be the text information inputted by the user through an input panel of the printer 22, as illustrated in (b) of FIG. 15.

The server 50 that received the function information and the search information searches for the web document based on the received function information and search information. The searched web document may be a web document exclusive for a printing job, for example.

Further, the server 50 determines at least one piece of content executable in the printer 22 from among the pieces of content included in the searched web document. By way of example, the determined piece of content may be all of the contents of the web document. Subsequently, the server 50 transmits the information on the determined content to the printer 22. In this case, the information on the content may be information where the web document has been rendered to a print data format that is outputable in the printer.

The printer 22 executes the received information on the content. For example, the printer 22 outputs the web document in the print data format.

According to another embodiment, the external device 20 may be realized as the medical device 23 (e.g., portable blood glucose measuring devices or blood pressure measuring devices).

In this case, the medical device 23 transmits a diagnosis function and a treatment function to the server 50 as the function information on the medical device 23.

Further, the medical device 23 transmits the search information on the web document to the server 50. The search information may be information recognized as the user tags an NFC tag or a RFID tag on a package or a coupon provided with the medical device 23 on a reader of the medical device 23, as illustrated in (c) of FIG. 15, for example.

The server 50 that received the function information and the search information may search for the web document based on the received function information and search information.

Further, the server 50 determines at least one piece of content executable in the medical device 23 from among the pieces of content included in the searched web document.

In response to the server 50 transmitting the information on the determined content to the medical device 23, the medical device 23 executes the information on the content.

By way of example, the medical device 23 may display a diagnosis method, a treatment method, usage of the device through a display of the medical device 23. Further, the medical device 23 may operate to perform self-diagnosis based on the information on the content or to measure biometric information on the user or give treatment to the user according to predetermined options.

According to another embodiment, the external device 20 may be realized as the home appliance 24 (e.g., oven or refrigerator).

In this case, the home appliance 24 transmits a cooking function or a refrigerating/warming function to the server 50 as the function information on the home appliance 24.

In this case, the home appliance 24 transmits the search information on the web document to the server 50. The search information may be information obtained by recognizing the user's voice, the text acquired from the user through the input panel, or information recognized by scanning a barcode provided at time of purchase of the home appliance 24 or reading tag information, as illustrated in (a)-(c) of FIG. 15, for example.

The server 50 that received the function information and the search information searches for the web document based on the received function information and search information.

Further, the server 50 determines at least one piece of content executable in the home appliance 24 from among the pieces of content included in the searched web document.

In response to the server 50 transmitting the information, the home appliance 24 executes the information on the content. By way of example, the home appliance 24 displays the cooking method or the usage of the device through a display of the home appliance 24. Further, the home appliance 24 performs the self-diagnosis based on the information on the content or cook the food according to predetermined options.

Meanwhile, the embodiment where the external device 20 acquires and transmits the search information and the embodiment where the external device 20 executes the information on the content may be applied to other external devices 20 in the same manner.

Figure 16:
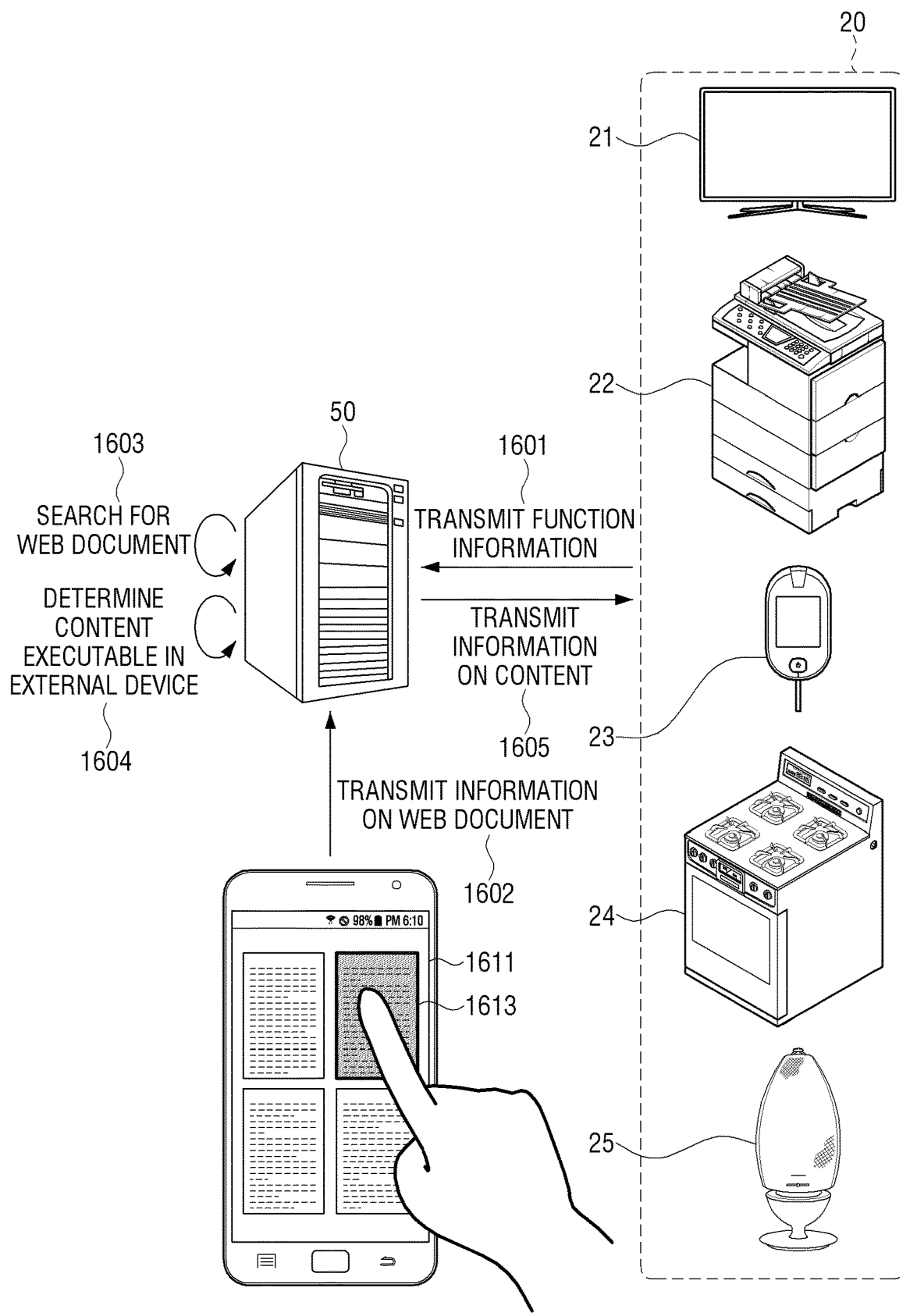
FIG. 16 is a diagram illustrating an electronic device sharing content with external devices, according to an embodiment of the present disclosure.

FIG. 16 is a diagram illustrating a server sharing content with an external device, according to an embodiment of the present disclosure.

In FIG. 16, in response to receiving a request for execution of content based on a web document, the external device 20 transmits the function information on the external device 20 to the server 50, in step 1601.

In response to an electronic device 10 being executed by the user, a web document list 1611 of web documents with a history of execution in the electronic device 10 being displayed, and at least one web document 1613 being selected from the web document list 1611, the electronic device 10 transmits information on the selected web document 1613 (e.g., link information on the web document 1613) to the server 50, in step 1602.

The server 50 that received the function information and the information on the web document searches for the web document 1613 again based on the information on the web document, in step S1603. In this case, the web document 1613 may be an updated web document.

The server 50 determines at least one piece of content executable in the external device 20 from among the pieces of content included in the searched web document, in step 1604.

Subsequently, the server 50 transmits the searched information on the content to the external device 20, in step 1605.

The external device 20 may execute the received information on the content. For example, the external device 20 may reproduce or display the content or may be controlled by the content.

Figure 17:
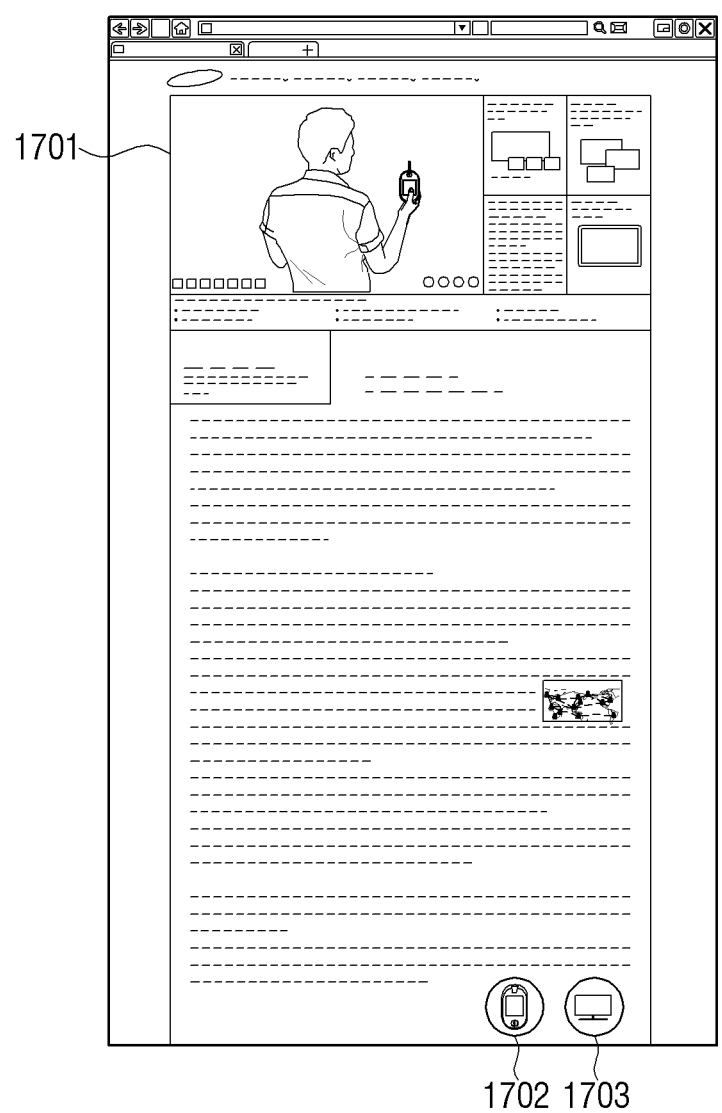
FIG. 17 is a diagram illustrating a web document, according to an embodiment of the present disclosure.

FIG. 17 is a diagram illustrating a web document, according to an embodiment of the present disclosure.

According to an embodiment, a web document 1701 is configured to display a plurality of pieces of device identification information 1702, 1703 indicating devices that may be used by the web document.

As an example, when the web document 1701 includes medical device-identification information 1702 as the device identification information, the web document 1701 may be a web document including descriptive information on the medical device or a web document including a control command for controlling the medical device. As another example, when the web document 1701 includes TV identification information 1703 as the device identification information, the web document may be a web document including the descriptive information on the TV or a web document with a large-sized font suitable for a display of the TV. When the web document 1701 includes a printer identification tag as the device identification information, the web document 1701 may be a web document including the descriptive information on the printer or a web document in a form suitable for output by the printer.

In response to receiving a request for information on the content from the external device 20, the server 50 may first search for a web document including the device identification information on a device of the same type as the external device 20.

Further, the server 50 may determine at least one content executable in the external device 20 from among the contents included in the searched web document and transmit the information on the determined content to the external device 20. In response to the searched web document being configured to be suitable for execution in the external device 20, the server 50 may transmit the searched web document to the external device 20.

The external device 20 may execute the received information on the content. For example, the external device 20 may reproduce or display the content or may be controlled by the content.

In order to display the device identification information 1702, 1703 in the web document 1701, a <device> tag may be added to a markup document structure of the web document 1701. In this case, a type and a display location of the device identification information may be determined according to a setting and a location of the <device> tag.

According to an embodiment, when a plurality of settings of the <device> tag are provided, for example, in response to the settings of the <device> tag being <device=TV,audio, Medical>, a plurality of pieces of device identification information may be displayed in the web document 1701.

The plurality of pieces of device identification information may be arranged by priority. By way of example, the plurality of pieces of device identification information may be arranged from left to right or from top to bottom in an order of devices with greater usability with respect to the web document 1701.

Further, the <device> tag may include an attribute value for determining whether to display the device identification information in the web document 1701. For example, when the attribute value being set to be <device=TV; invisible>, the device identification information on the TV is not displayed in the web document 1701, but the server 50 may use the device identification information on the TV in order to search for the web document suitable for execution in the external device 20, with reference to the device identification information.

Figure 18:
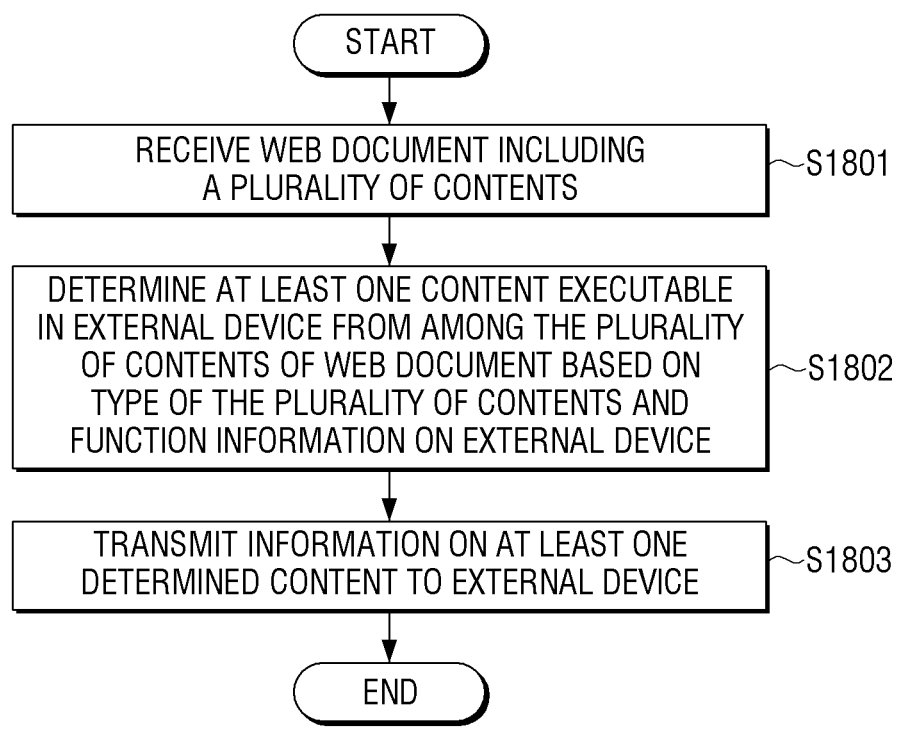
FIGS. 18 and 19 are flowcharts illustrating the sharing of content of an electronic device, according to an embodiment of the present disclosure.

FIG. 18 is a flowchart illustrating a method of sharing content by an electronic device, according to an embodiment of the present disclosure.

Referring to FIG. 18, in step S1801, the electronic device 10 receives a web document including a plurality of pieces of content.

In step S1802, the electronic device 10 determines at least one piece of content executable in the external device 20 from among the plurality of pieces of content of the received web document based on the type of the plurality of pieces of content and the function information on the external device 20.

In step S1803, the electronic device 10 transmits information on the at least one determined piece of content to the external device 20.

The external device 20 that received the information on the at least one determined content may reproduce or display the content based on the information on the content. In response to the content being a link address, the external device 20 may reproduce or display a video or an image indicated by the link address.

Figure 19:
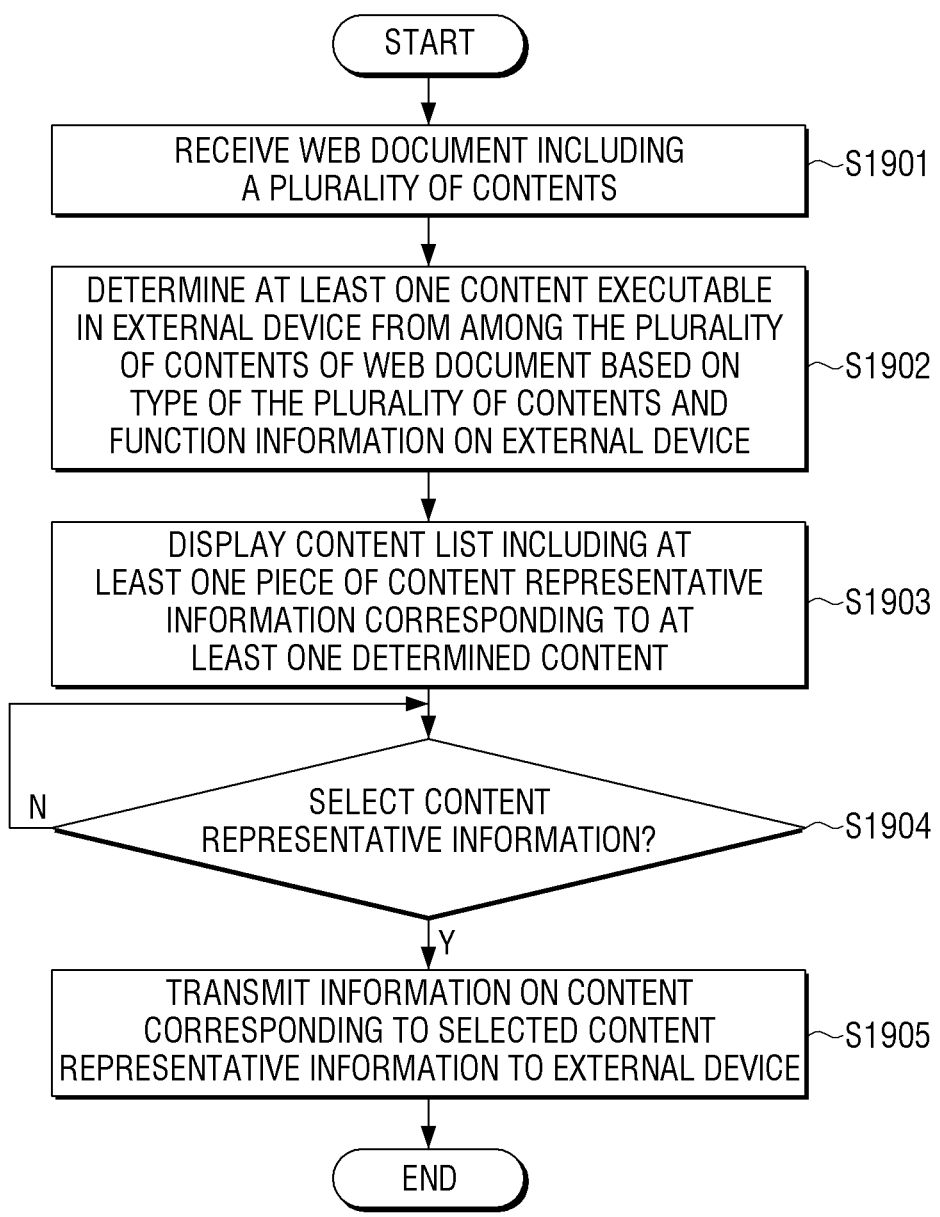

FIG. 19 is a flowchart illustrating a method for displaying notification information, according to another embodiment of the present disclosure.

Referring to FIG. 19, in step S1901, the electronic device 10 receives a web document including a plurality of pieces of content.

In step S1902, the electronic device 10 determines at least one piece of content executable in the external device 20 from among the plurality of pieces of content of the received web document based on the type of the plurality of pieces of content and the function information on the external device 20.

In step S1903, the electronic device 10 displays a content list including at least one piece of content representative information corresponding to the at least one determined piece of content.

In step S1904, the electronic device 10 determines whether one piece of content representative information is selected from the content list.

When one piece of content representative information is selected, the electronic device 10 transmits information on content corresponding to the selected content representative information to the external device 20, in step S1905.

The external device 20 that received the information on the content may reproduce or display the content based on the information on the content. In response to the content being a link address, the external device 20 may reproduce or display a video or an image indicated by the link address.

The devices (e.g., modules or the electronic device 10) or the methods (e.g., operations) according to the above-described various embodiments may be operated or performed by at least one computer (e.g., the processor 190) that executes instructions included in at least one program among programs maintained in a computer-readable storage medium, for example.

In response to the instructions being executed by the computer (e.g., the processor 190), the at least one computer may execute functions corresponding to the instructions. In this case, the computer-readable storage medium may be the memory 150, for example.

The programs may be stored in the computer-readable storage medium, such as, a hard disc, a floppy disc, a magnetic medium (e.g., magnetic tapes), an optical medium (e.g., compact disc-ROM (CD-ROM), DVD, magneto-optical medium (e.g., floptical disc), hardware devices (e.g., ROM, RAM, or flash memory), or the like. In this case, the storage medium is included in the electronic device 10 as a part of the components generally. The storage medium may be mounted through a port of the electronic device 10 or may be included in an external device (e.g., cloud, servers or other electronic devices) located outside the electronic device 10. The programs may be stored in a plurality of storage mediums, and in this case, at least some of the storage mediums may be located in the external device of the electronic device 10.

The instructions may include high-level language codes executable by a computer using an interpreter, as well as machine language codes made by a compiler. The hardware devices may be configured to operate as one or more software modules to perform the operations in the above-described various embodiments, and vice versa.

According to the above-described embodiments of the present disclosure, it is possible to enhance the usability of the user using the method for sharing a content.

As an example, the content to be transmitted to the external device is determined automatically, and thus, the steps for sharing the content may decrease.

As another example, a content list of the contents executable in the external device is provided automatically, and the user is able to select and reproduce a particular piece of content rapidly from the content list. Accordingly, the user satisfaction may be enhanced.

While the present disclosure has been shown and described with reference to certain embodiments thereof, it will be understood by those skilled in the art that various changes in form and detail may be made therein without departing from the sprit and scope of the present disclosure as defined by the appended claims.

What is claimed is:

1. A method for sharing content between an electronic device and an external device, the method comprising:
   receiving a plurality of web documents comprising a plurality of contents;
   receiving, from the external device, search information for identifying executable content in a web document;
   receiving, from the external device, function information indicating executable functions of the external device for searching types of content in a web document that are executable in the external device;
   identifying a web document among the received plurality of web documents that includes executable content corresponding to a keyword included in the received search information;
   identifying, from the executable content in the identified web document, a type of content that is executable in the external device corresponding to the received function information;
   providing a screen mode corresponding to the identified type of content,
   based on the identified type of content that is executable in the external device corresponding to a type of at least one of contents among a plurality of contents included in the identified web document, obtaining the at least one of the contents; and transmitting information on the obtained at least one of the contents to the external device, wherein transmitting the information comprises:
  generating a content list including content representative information corresponding to the obtained at least one of the contents; and
  transmitting the content list to the external device, and wherein the method further comprises:
  displaying, on the electronic drive, the generated content list, and
  displaying, on the electronic drive, a device identification information indicating the obtained at least one of the contents is executable by the external device;

wherein the function information includes at least two functions executed mainly by the external device, and wherein the method further comprising:
  based on the electronic device being connectable to a plurality of external devices including a first external device and a second external device, identifying at least two functions of the first external device,
  identifying a function with a higher performance in the first external device than in the second external device among the at least two functions of the first external device, and identifying a type of content that is executable in the first external device based on the identified function.

2. The method as claimed in claim 1, wherein transmitting the information comprises:
  generating a template file including the obtained at least one of the contents; and
  transmitting the template file to the external device.

3. The method as claimed in claim 1, wherein transmitting the information comprises:
  transmitting, in response to one content representative information being selected from the content list, information on one content, corresponding to the one content representative information, to the external device.

4. The method as claimed in claim 1, further comprising:
  receiving another web document related to the web document;
  obtaining at least one other content that is executable in the external device from among a plurality of contents included in the other web document; and
  transmitting information on the obtained at least one other content to the external device.

5. The method as claimed in claim 1, further comprising:
  displaying, on a display of the electronic device, a user interface (UI) for controlling the plurality of contents at the external device.

6. The method as claimed in claim 1, wherein the content comprises at least one of a video, audio content, text, an image, a video link address, an audio link address, a text link address, an image link address, a video thumbnail, a text thumbnail, and an image thumbnail.

7. The method as claimed in claim 1, further comprising:
  rendering the obtained at least one of the contents; and
  transmitting information on the rendered at least one of the contents to the external device.

8. An electronic device sharing content with an external device, the device comprising:
  a display;
  a communicator including circuitry configured to communicate with the external device;
  a processor configured to:
    control the communicator to receive a plurality of web documents comprising a plurality of contents,
    control the communicator to receive, from the external device, search information for identifying executable content in a web document;
    receive, from the external device, function information indicating executable functions of the external device for searching types of content in a web document that are executable in the external device,
    identify a web document among the plurality of web documents that includes executable content corresponding to a keyword included in the received search information,
    identify, from the executable content in the identified web document, a type of content that is executable in the external device corresponding to the received function information,
    provide a screen mode corresponding to the identified type of content,
    based on the identified type of content that is executable in the external device corresponding to a type of at least one of contents among a plurality of contents included in the identified web document, obtaining the at least one of contents, and
    transmit information on the obtained at least one of the contents to the external device,
    generate a content list including content representative information corresponding to the obtained at least one of the contents,
    transmit the content list to the external device through the communicator,
    control the display, on the electronic drive, to display the generated content list, and
    control the display, on the electronic drive, to display a device identification information indicating the obtained at least one of the contents is executable by the external device;
  wherein the function information includes at least two functions executed mainly by the external device, and
  wherein the processor further configured to:
    based on the electronic device being connectable to a plurality of external devices including a first external device and a second external device, identify at least two functions of the first external device,
    identify a function with a higher performance in the first external device than in another the second external device among the at least two functions of the first external device, and
    identify a type of content that is executable in the first external device based on the identified function.

9. The device as claimed in claim 8, wherein the processor is further configured to:
  generate a template file including the obtained at least one of the contents, and
  transmit the template file to the external device through the communicator.

10. The device as claimed in claim 8, wherein, in response to one content representative information being selected from the content list, the processor is further configured to transmit information on one content, corresponding to the one selected content representative information, to the external device through the communicator.

11. The device as claimed in claim 8, wherein the processor is further configured to:
  receive another web document related to the web document, obtain at least one other content that is executable in the external device from among a plurality of contents included in the other web document, and transmit information on the obtained at least one other content to the external device through the communicator.

12. The device as claimed in claim 8, wherein the display is further configured to display a user interface (UI) for controlling the plurality of contents at the external device.

13. The device as claimed in claim 8, wherein the content comprises at least one of a video, audio content, text, an image, a video link address, an audio link address, a text link address, an image link address, a video thumbnail, a text thumbnail, and an image thumbnail.

14. An article of manufacture for sharing content between an electronic device and an external device, comprising a non-transitory machine readable medium containing one or more programs which when executed implement the steps of:

receiving a plurality of web documents comprising a plurality of contents;

receiving, from the external device, search information for identifying executable content in a web document;

receiving, from the external device, function information indicating executable functions of the external device for searching types of content in a web document that are executable in the external device;

identifying a web document among the received plurality of web documents that includes executable content corresponding to a keyword included in the received search information;

identifying, from the executable content in the identified web document, a type of content that is executable in the external device corresponding to the received function information;

providing a screen mode corresponding to the identified type of content, based on the identified type of content that is executable in the external device corresponding to a type of at least one of contents among a plurality of contents included in the identified web document, obtaining the at least one of the contents; and transmitting information on the obtained at least one of the contents to the external device, wherein transmitting the information comprises:
generating a content list including content representative information corresponding to the obtained at least one of the contents; and
transmitting the content list to the external device, and wherein the method further comprises:
displaying, on the electronic drive, the generated content list, and
displaying, on the electronic drive, a device identification information indicating the obtained at least one of the contents is executable by the external device;

wherein the function information includes at least two functions executed mainly by the external device, and wherein the method further comprising:

based on the electronic device being connectable to a plurality of external devices including a first external device and a second external device, identifying at least two functions of the first external device, identifying a function with a higher performance in the first external device than in the second external device among the at least two functions of the first external device, and identifying a type of content that is executable in the first external device based on the identified function.

* * * * *